US011831977B2

(12) United States Patent
Cui et al.

(10) Patent No.: US 11,831,977 B2
(45) Date of Patent: Nov. 28, 2023

(54) PHOTOGRAPHING AND PROCESSING METHOD AND ELECTRONIC DEVICE

(71) Applicant: Huawei Technologies Co., Ltd., Shenzhen (CN)

(72) Inventors: Hantao Cui, Beijing (CN); Guangyuan Li, Beijing (CN); Zuochao Zhang, Beijing (CN); Zhiwu Xia, Shenzhen (CN); Rui Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/777,259

(22) PCT Filed: Nov. 11, 2020

(86) PCT No.: PCT/CN2020/128214
§ 371 (c)(1),
(2) Date: May 16, 2022

(87) PCT Pub. No.: WO2021/093793
PCT Pub. Date: May 20, 2021

(65) Prior Publication Data
US 2022/0394190 A1 Dec. 8, 2022

(30) Foreign Application Priority Data
Nov. 15, 2019 (CN) .......................... 201911120504.6

(51) Int. Cl.
*H04N 23/63* (2023.01)
*H04N 5/262* (2006.01)
(Continued)

(52) U.S. Cl.
CPC ......... *H04N 23/632* (2023.01); *H04N 5/2628* (2013.01); *H04N 23/62* (2023.01); *H04N 23/683* (2023.01)

(58) Field of Classification Search
CPC .... H04N 23/632; H04N 5/2628; H04N 23/62; H04N 23/683; H04N 23/64; H04N 23/69; H04N 23/67
(Continued)

(56) References Cited

U.S. PATENT DOCUMENTS 6,757,008 B1 * 6/2004 Smith .................. H04N 23/698
348/169
6,977,676 B1 * 12/2005 Sato ....................... H04N 7/142
348/E7.086

(Continued)

FOREIGN PATENT DOCUMENTS

CN  101547311 A  9/2009
CN  102291569 A  12/2011
(Continued)

OTHER PUBLICATIONS

"Series H: Audiovisual and Multimedia Systems, Infrastructure of audiovisual services—Coding of moving video, Advanced video coding for generic audiovisual services," ITU-T H.264, Total 836 pages, International Union of Telecommunication, Geneva, Switzerland (Jun. 2019).

*Primary Examiner* — Usman A Khan
(74) *Attorney, Agent, or Firm* — Leydig, Voit & Mayer, Ltd.

(57) ABSTRACT

A photographing method applied to an electronic device includes: when a camera of the electronic device is started to perform photographing, the electronic device displays a first viewfinder frame, and displays a first preview picture. When a zoom magnification used by the electronic device increases to be greater than a preset zoom magnification, the electronic device displays the first viewfinder frame and a second viewfinder frame. The first viewfinder frame displays a second preview picture, and the second viewfinder frame displays a third preview picture, and a viewfinder
(Continued)

range of the camera corresponding to the third preview picture is greater than a viewfinder range of the camera corresponding to the second preview picture.

20 Claims, 15 Drawing Sheets

(51) Int. Cl.
  *H04N 23/62* (2023.01)
  *H04N 23/68* (2023.01)
(58) Field of Classification Search
  USPC ........................................................ 348/208.6
  See application file for complete search history.

(56) References Cited

U.S. PATENT DOCUMENTS

| | | | |
|---|---|---|---|
| 9,781,356 B1 | 10/2017 | Banta et al. | |
| 2002/0152557 A1* | 10/2002 | Elberbaum | H04N 23/54 |
| | | | 348/E7.086 |
| 2003/0160886 A1* | 8/2003 | Misawa | H04N 23/45 |
| | | | 348/240.1 |
| 2005/0100087 A1* | 5/2005 | Hasegawa | H04N 7/181 |
| | | | 348/E7.086 |
| 2006/0115185 A1* | 6/2006 | Iida | H04N 5/2628 |
| 2007/0064141 A1* | 3/2007 | Misawa | H04N 23/54 |
| | | | 348/E5.045 |
| 2007/0064142 A1* | 3/2007 | Misawa | H04N 23/69 |
| | | | 348/E5.045 |
| 2007/0103577 A1* | 5/2007 | Misawa | H04N 23/45 |
| | | | 348/E5.045 |
| 2009/0027334 A1* | 1/2009 | Foulk | G06F 3/04886 |
| | | | 345/157 |
| 2009/0167896 A1* | 7/2009 | Nakayama | H04N 5/2628 |
| | | | 348/240.1 |
| 2010/0141803 A1* | 6/2010 | Jung | H04N 5/262 |
| | | | 348/E5.051 |
| 2011/0106320 A1* | 5/2011 | Hall | A01G 25/165 |
| | | | 715/771 |
| 2011/0292438 A1* | 12/2011 | Inami | H04N 1/00413 |
| | | | 358/1.15 |
| 2012/0268641 A1* | 10/2012 | Kazama | H04N 23/45 |
| | | | 348/E5.051 |
| 2014/0267803 A1 | 9/2014 | Shintani et al. | |
| 2015/0185987 A1* | 7/2015 | Tsai | G06F 3/0483 |
| | | | 715/798 |
| 2017/0013179 A1 | 1/2017 | Kang et al. | |
| 2019/0082101 A1* | 3/2019 | Baldwin | H04N 23/635 |

FOREIGN PATENT DOCUMENTS

| | | |
|---|---|---|
| CN | 102348059 A | 2/2012 |
| CN | 101848338 B | 8/2012 |
| CN | 104142799 A | 11/2014 |
| CN | 104683689 A | 6/2015 |
| CN | 106412431 A | 2/2017 |
| CN | 107566725 A | 1/2018 |
| CN | 108536364 A | 9/2018 |
| CN | 110445978 A | 11/2019 |
| CN | 110908558 A | 3/2020 |
| CN | 111010506 A | 4/2020 |
| EP | 3291533 A1 | 3/2018 |
| JP | S61248165 A | 11/1986 |
| JP | 2013187626 A | 9/2013 |
| JP | 2016174434 A | 9/2016 |
| WO | 2017200049 A1 | 11/2017 |

* cited by examiner

PHOTOGRAPHING AND PROCESSING METHOD AND ELECTRONIC DEVICE

CROSS-REFERENCE TO RELATED APPLICATIONS

This application is a national stage of International Application No. PCT/CN2020/128214, filed on Nov. 11, 2020, which claims priority to Chinese Patent Application No. 201911120504.6, filed on Nov. 15, 2019. Both of the aforementioned applications are hereby incorporated by reference in their entireties.

TECHNICAL FIELD

This application relates to the field of electronic technologies, and in particular, to a photographing method and an electronic device.

BACKGROUND

Currently, a mobile phone is usually configured with a plurality of cameras to meet various photographing scenarios of a user. The plurality of cameras may include cameras with a plurality of focal lengths, for example, may include a short-focus (wide-angle) camera, a medium-focus camera, and a long-focus camera. Different cameras correspond to different viewfinder ranges and zoom magnifications.

When the user performs photographing, the mobile phone may switch cameras with different focal lengths (that is, optical zoom) for photographing, and sometimes may process a captured picture in combination with a software processing manner of digital zoom, to meet various high-magnification photographing scenarios.

However, in the high-magnification photographing scenario, a viewfinder range of the mobile phone is only a part of a to-be-photographed scene, and is usually relatively small. When a photographed object is in a moving state, it is very likely that the photographed object moves out of the viewfinder range. Consequently, the mobile phone fails to capture the photographed object, and the user can do nothing but blindly move the mobile phone to search for the photographed object, resulting in poor photographing experience.

SUMMARY

According to a photographing method provided in this application, photographing experience of a user in a photographing scenario with a high zoom magnification can be improved.

Embodiments of this application provide the following technical solutions:

According to a first aspect, a photographing preview method is provided. The method is applied to an electronic device including a camera, and the method includes: starting the camera, and the electronic device displays a first viewfinder frame. The first viewfinder frame is configured to display a first preview picture, and a zoom magnification of the camera corresponding to the first preview picture is a first magnification. The electronic device receives a first operation that is input by a user and that is of increasing the zoom magnification of the camera. In response to the first operation, the first viewfinder frame displays a second preview picture. A zoom magnification of the camera corresponding to the second preview picture is a second magnification, and the second magnification is greater than the first magnification. If the second magnification is greater than or equal to a preset magnification, the electronic device further displays a second viewfinder frame. The second viewfinder frame is configured to display a third preview picture, and a viewfinder range of the camera corresponding to the third preview picture is greater than a viewfinder range of the camera corresponding to the second preview picture. The second viewfinder frame further includes a marker frame, and the marker frame is used to identify a picture that is in the third preview picture and whose viewfinder range is the same as that of the second preview picture.

It can be learned that the user may use the preview picture with a larger viewfinder range in the second viewfinder frame to perform framing composition on the picture in the first viewfinder frame, and photograph a moving object, thereby improving photographing experience of the user in a high-magnification photographing scenario.

In a possible implementation, the first operation of increasing the zoom magnification of the camera is any one of one or more operations on a zoom magnification indication control, sliding towards a frame of the electronic device by two fingers, dragging a slider on a zoom ruler, selecting an option of switching to a long-focus camera, and selecting an option of switching to a long-focus photographing scenario.

In a possible implementation, that the electronic device displays a first viewfinder frame includes: The electronic device displays the first viewfinder frame on a photographing preview interface, or the electronic device displays the first viewfinder frame on a video recording interface. It can be learned that the method provided in this embodiment of this application may be applied to a function of photographing or recording a video.

In a possible implementation, the method further includes: The electronic device receives a second operation that is input by the user and that is of increasing the zoom magnification of the camera. In response to the second operation, the first viewfinder frame displays a fourth preview picture. A zoom magnification of the camera corresponding to the fourth preview picture is a third magnification, and the third magnification is greater than the second magnification. The second viewfinder frame displays a fifth preview picture. A viewfinder range of the camera corresponding to the fifth preview picture is the same as the viewfinder range of the camera corresponding to the third preview picture, and a size of the marker frame in the second viewfinder frame becomes smaller.

It can be learned that as the user increases the zoom magnification of the camera, a viewfinder range of the first viewfinder frame becomes smaller. However, the viewfinder range of the second viewfinder frame does not change. Correspondingly, a marker frame that is of the viewfinder range of the first viewfinder frame and that is marked in the second viewfinder frame decreases.

In a possible implementation, the method further includes: The electronic device receives a third operation that is input by the user and that is of decreasing the zoom magnification of the camera. In response to the third operation, the first viewfinder frame displays a sixth preview picture. A zoom magnification of the camera corresponding to the sixth preview picture is a fourth magnification, and the fourth magnification is less than the second magnification. If the fourth magnification is greater than or equal to the preset magnification, the second viewfinder frame displays a seventh preview picture. A viewfinder range of the camera corresponding to the seventh preview picture is the same as the viewfinder range of the camera corresponding to the third preview picture; and a size of the marker frame in the second viewfinder frame becomes larger. If the fourth magnification is less than the preset magnification, the electronic device does not display the second viewfinder frame.

It can be learned that as the user decreases the zoom magnification of the camera, a viewfinder range of the first viewfinder frame becomes larger. However, the viewfinder range of the second viewfinder frame does not change. Correspondingly, a marker frame that is of the viewfinder range of the first viewfinder frame and that is marked in the second viewfinder frame increases. If the zoom magnification of the camera decreases to be less than the preset magnification, the electronic device no longer displays the second viewfinder frame.

In a possible implementation, the method further includes: The electronic device receives a fourth operation that is input by the user and that is of increasing the zoom magnification of the camera. In response to the fourth operation, the first viewfinder frame displays an eighth preview picture. A zoom magnification of the camera corresponding to the eighth preview picture is a fifth magnification, and the fifth magnification is greater than the second magnification. The second viewfinder frame displays a ninth preview picture. A viewfinder range of the camera corresponding to the ninth preview picture is greater than a viewfinder range of the camera corresponding to the eighth preview picture, and is smaller than the viewfinder range of the camera corresponding to the third preview picture.

It can be learned that as the user increases the zoom magnification of the camera, a viewfinder range of the first viewfinder frame becomes smaller, and the viewfinder range of the second viewfinder frame becomes larger, but the viewfinder range of the second viewfinder frame is still greater than the viewfinder range of the first viewfinder frame. In this scenario, a zoom magnification of the picture in the second viewfinder frame is closer to the zoom magnification of the image in the first viewfinder frame, and a viewfinder range is closer. This helps the user more accurately determine a to-be-photographed object in the first viewfinder frame based on the image in the second viewfinder frame.

In a possible implementation, the method further includes: The electronic device receives a fifth operation that is input by the user and that is of decreasing the zoom magnification of the camera. In response to the fifth operation, the first viewfinder frame displays a tenth preview picture. A zoom magnification of the camera corresponding to the tenth preview picture is a sixth magnification, and the sixth magnification is less than the second magnification. If the sixth magnification is greater than or equal to the preset magnification, the second viewfinder frame displays an eleventh preview picture. A viewfinder range of the camera corresponding to the eleventh preview picture is greater than a viewfinder range of the camera corresponding to the tenth preview picture, and is greater than the viewfinder range of the camera corresponding to the third preview picture. If the sixth magnification is less than the preset magnification, the electronic device does not display the second viewfinder frame.

It can be learned that as the user decreases the zoom magnification of the camera, a viewfinder range of the first viewfinder frame becomes larger, and the viewfinder range of the second viewfinder frame also becomes larger. If the zoom magnification of the camera decreases to be less than the preset magnification, the electronic device no longer displays the second viewfinder frame.

In a possible implementation, the method further includes: The electronic device captures a picture by using a first camera of the electronic device. The electronic device performs zoom processing on the picture captured by the first camera to obtain a preview picture displayed in the first viewfinder frame. The electronic device determines the picture captured by the first camera as a preview picture displayed in the second viewfinder frame, or performs zoom processing on the picture captured by the first camera to obtain a preview picture displayed in the second viewfinder frame. A zoom magnification corresponding to the preview picture displayed in the second viewfinder frame is less than or equal to a zoom magnification corresponding to the preview picture displayed in the first viewfinder frame. Therefore, a method for simultaneously displaying the preview picture in the first viewfinder frame and the preview picture in the second viewfinder frame is provided.

In a possible implementation, the first camera is a long-focus camera.

In a possible implementation, the method further includes: The electronic device separately captures pictures by using a second camera and a third camera that are of the electronic device. The electronic device performs zoom processing on the picture captured by the second camera to obtain a preview picture displayed in the first viewfinder frame.

The electronic device determines the picture captured by the third camera as a preview picture displayed in the second viewfinder frame, or performs zoom processing on the picture captured by the third camera to obtain a preview picture displayed in the second viewfinder frame. A zoom magnification corresponding to the preview picture displayed in the second viewfinder frame is less than or equal to a zoom magnification corresponding to the preview picture displayed in the first viewfinder frame. Therefore, another method for simultaneously displaying the preview picture in the first viewfinder frame and the preview picture in the second viewfinder frame is provided.

In a possible implementation, the second camera is a long-focus camera, and the third camera is a short-focus camera or a medium-focus camera.

In a possible implementation, if the zoom magnification corresponding to the preview picture displayed in the second viewfinder frame is K1, and the zoom magnification corresponding to the preview picture displayed in the first viewfinder frame is K2, a value of an area of the picture in the marker frame in the second viewfinder frame/an area of the preview picture displayed in the second viewfinder frame is $(K1/K2)^2$.

In a possible implementation, when displaying the second viewfinder frame, the electronic device may further display a close control corresponding to the second viewfinder frame. In this case, in response to an operation performed by the user on the close control corresponding to the second viewfinder frame, the electronic device closes the second viewfinder frame.

For example, when the to-be-photographed object is still, or when the user determines the viewfinder range of the first viewfinder frame, the user may manually close the second viewfinder frame to view more picture content in the first viewfinder frame, so as to meet different requirements of the user in different photographing scenarios.

In a possible implementation, when the electronic device closes the second viewfinder frame, the electronic device displays a restoration control corresponding to the second viewfinder frame.

In a possible implementation, the electronic device marks a target photographed object in the preview picture displayed in the second viewfinder frame. It can be learned that the user may pay attention to the target photographed object in real time in the second viewfinder frame, so that the target photographed object can be tracked and photographed.

According to a second aspect, an electronic device is provided, including a processor, a memory, and one or more cameras. The memory, the one or more cameras are coupled to the processor, the memory is configured to store computer program code, the computer program code includes computer instructions, and when the processor reads the computer instructions from the memory, the electronic device is enabled to perform the following operations: starting the camera to display a first viewfinder frame. The first viewfinder frame is configured to display a first preview picture, and a zoom magnification of the camera corresponding to the first preview picture is a first magnification. The electronic device receives a first operation that is input by a user and that is of increasing the zoom magnification of the camera. In response to the first operation, the first viewfinder frame displays a second preview picture. A zoom magnification of the camera corresponding to the second preview picture is a second magnification, and the second magnification is greater than the first magnification. If the second magnification is greater than or equal to a preset magnification, a second viewfinder frame is further displayed. The second viewfinder frame is configured to display a third preview picture, and a viewfinder range of the camera corresponding to the third preview picture is greater than a viewfinder range of the camera corresponding to the second preview picture. The second viewfinder frame further includes a marker frame, and the marker frame is used to identify a picture that is in the third preview picture and whose viewfinder range is the same as that of the second preview picture.

In a possible implementation, the first operation of increasing the zoom magnification of the camera is any one of one or more operations on a zoom magnification indication control, sliding towards a frame of the electronic device by two fingers, dragging a slider on a zoom ruler, selecting an option of switching to a long-focus camera, and selecting an option of switching to a long-focus photographing scenario.

In a possible implementation, the displaying a first viewfinder frame includes: displaying the first viewfinder frame on a photographing preview interface, or displaying the first viewfinder frame on a video recording interface.

In a possible implementation, the electronic device further performs the following operations: receiving a second operation that is input by the user and that is of increasing the zoom magnification of the camera. In response to the second operation, the first viewfinder frame displays a fourth preview picture. A zoom magnification of the camera corresponding to the fourth preview picture is a third magnification, and the third magnification is greater than the second magnification. The second viewfinder frame displays a fifth preview picture. A viewfinder range of the camera corresponding to the fifth preview picture is the same as the viewfinder range of the camera corresponding to the third preview picture, and a size of the marker frame in the second viewfinder frame becomes smaller.

In a possible implementation, the electronic device further performs the following operations: receiving a third operation that is input by the user and that is of decreasing the zoom magnification of the camera. In response to the third operation, the first viewfinder frame displays a sixth preview picture. A zoom magnification of the camera corresponding to the sixth preview picture is a fourth magnification, and the fourth magnification is less than the second magnification. If the fourth magnification is greater than or equal to the preset magnification, the second viewfinder frame displays a seventh preview picture. A viewfinder range of the camera corresponding to the seventh preview picture is the same as the viewfinder range of the camera corresponding to the third preview picture; and a size of the marker frame in the second viewfinder frame becomes larger. If the fourth magnification is less than the preset magnification, the electronic device does not display the second viewfinder frame.

In a possible implementation, the electronic device further performs the following operations: receiving a fourth operation that is input by the user and that is of increasing the zoom magnification of the camera. In response to the fourth operation, the first viewfinder frame displays an eighth preview picture. A zoom magnification of the camera corresponding to the eighth preview picture is a fifth magnification, and the fifth magnification is greater than the second magnification. The second viewfinder frame displays a ninth preview picture. A viewfinder range of the camera corresponding to the ninth preview picture is greater than a viewfinder range of the camera corresponding to the eighth preview picture, and is smaller than the viewfinder range of the camera corresponding to the third preview picture.

In a possible implementation, the electronic device further performs the following operations: receiving a fifth operation that is input by the user and that is of decreasing the zoom magnification of the camera. In response to the fifth operation, the first viewfinder frame displays a tenth preview picture. A zoom magnification of the camera corresponding to the tenth preview picture is a sixth magnification, and the sixth magnification is less than the second magnification. If the sixth magnification is greater than or equal to the preset magnification, the second viewfinder frame displays an eleventh preview picture. A viewfinder range of the camera corresponding to the eleventh preview picture is greater than a viewfinder range of the camera corresponding to the tenth preview picture, and is greater than the viewfinder range of the camera corresponding to the third preview picture. If the sixth magnification is less than the preset magnification, the electronic device does not display the second viewfinder frame.

In a possible implementation, the electronic device further performs the following operations: capturing a picture by using a first camera of the electronic device, and performing zoom processing on the picture captured by the first camera to obtain a preview picture displayed in the first viewfinder frame; determining the picture captured by the first camera as a preview picture displayed in the second viewfinder frame, or performing zoom processing on the picture captured by the first camera to obtain a preview picture displayed in the second viewfinder frame. A zoom magnification corresponding to the preview picture displayed in the second viewfinder frame is less than or equal to a zoom magnification corresponding to the preview picture displayed in the first viewfinder frame.

In a possible implementation, the first camera is a long-focus camera.

In a possible implementation, the electronic device further performs the following operations: separately capturing pictures by using a second camera and a third camera that are of the electronic device; performing zoom processing on the picture captured by the second camera to obtain a preview picture displayed in the first viewfinder frame; and determining the picture captured by the third camera as a preview picture displayed in the second viewfinder frame, or performing zoom processing on the picture captured by the third camera to obtain a preview picture displayed in the second viewfinder frame. A zoom magnification corresponding to the preview picture displayed in the second viewfinder frame is less than or equal to a zoom magnification corresponding to the preview picture displayed in the first viewfinder frame.

In a possible implementation, the second camera is a long-focus camera, and the third camera is a short-focus camera or a medium-focus camera.

In a possible implementation, if the zoom magnification corresponding to the preview picture displayed in the second viewfinder frame is K1, and the zoom magnification corresponding to the preview picture displayed in the first viewfinder frame is K2, a value of an area of the picture in the marker frame in the second viewfinder frame/an area of the preview picture displayed in the second viewfinder frame is $(K1/K2)^2$.

In a possible implementation, when displaying the second viewfinder frame, the electronic device may further display a close control corresponding to the second viewfinder frame, and in response to an operation performed by the user on the close control corresponding to the second viewfinder frame, the second viewfinder frame is closed.

In a possible implementation, when the electronic device closes the second viewfinder frame, a restoration control corresponding to the second viewfinder frame is displayed.

In a possible implementation, the electronic device marks a target photographed object in the preview picture displayed in the second viewfinder frame.

According to a third aspect, an apparatus is provided. The apparatus is included in an electronic device, and the apparatus has a function of implementing behavior of the electronic device in any method according to any one of the foregoing aspects and the possible implementations of the foregoing aspects. The function may be implemented by hardware, or may be implemented by hardware executing corresponding software. The hardware or the software includes at least one module or unit corresponding to the function, for example, a receiving module or unit, a display module or unit, and a processing module or unit.

According to a fourth aspect, a computer-readable storage medium is provided, including computer instructions. When the computer instructions are run on a terminal, the terminal is enabled to perform the method according to any one of the foregoing aspects and the possible implementations of the foregoing aspects.

According to a fifth aspect, a graphical user interface on an electronic device is provided. The electronic device includes a display, a camera, a memory, and one or more processors. The one or more processors are configured to execute one or more computer programs stored in the memory; and the graphical user interface includes a graphical user interface displayed when the electronic device performs the method according to any one of the foregoing aspects and the possible implementations of the foregoing aspects.

According to a sixth aspect, a computer program product is provided. When the computer program product is run on a computer, the computer is enabled to perform the method according to any one of the foregoing aspects and the possible implementations of the foregoing aspects.

According to a seventh aspect, a chip system is provided, including a processor. When the processor executes instructions, the processor performs the method according to any one of the foregoing aspects and the possible implementations of the foregoing aspects.

DETAILED DESCRIPTION

In description of the embodiments of this application, "I" means "or" unless otherwise specified. For example, AB may represent A or B. In this specification, "and/or" describes only an association relationship of associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise specified, "a plurality of" means two or more than two.

In the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a related concept in a specific manner.

A photographing method provided in the embodiments of this application may be applied to an electronic device on which a camera is disposed. The electronic device may be, for example, a mobile phone, a tablet computer, a personal computer (PC), a personal digital assistant (PDA), a smartwatch, a netbook, a wearable electronic device, an augmented reality technology (AR) device, a virtual reality (VR) device, a vehicle-mounted device, a smart screen, a smart car, a smart speaker, or a robot. A specific form of the electronic device is not specifically limited in this application.

Figure 1:
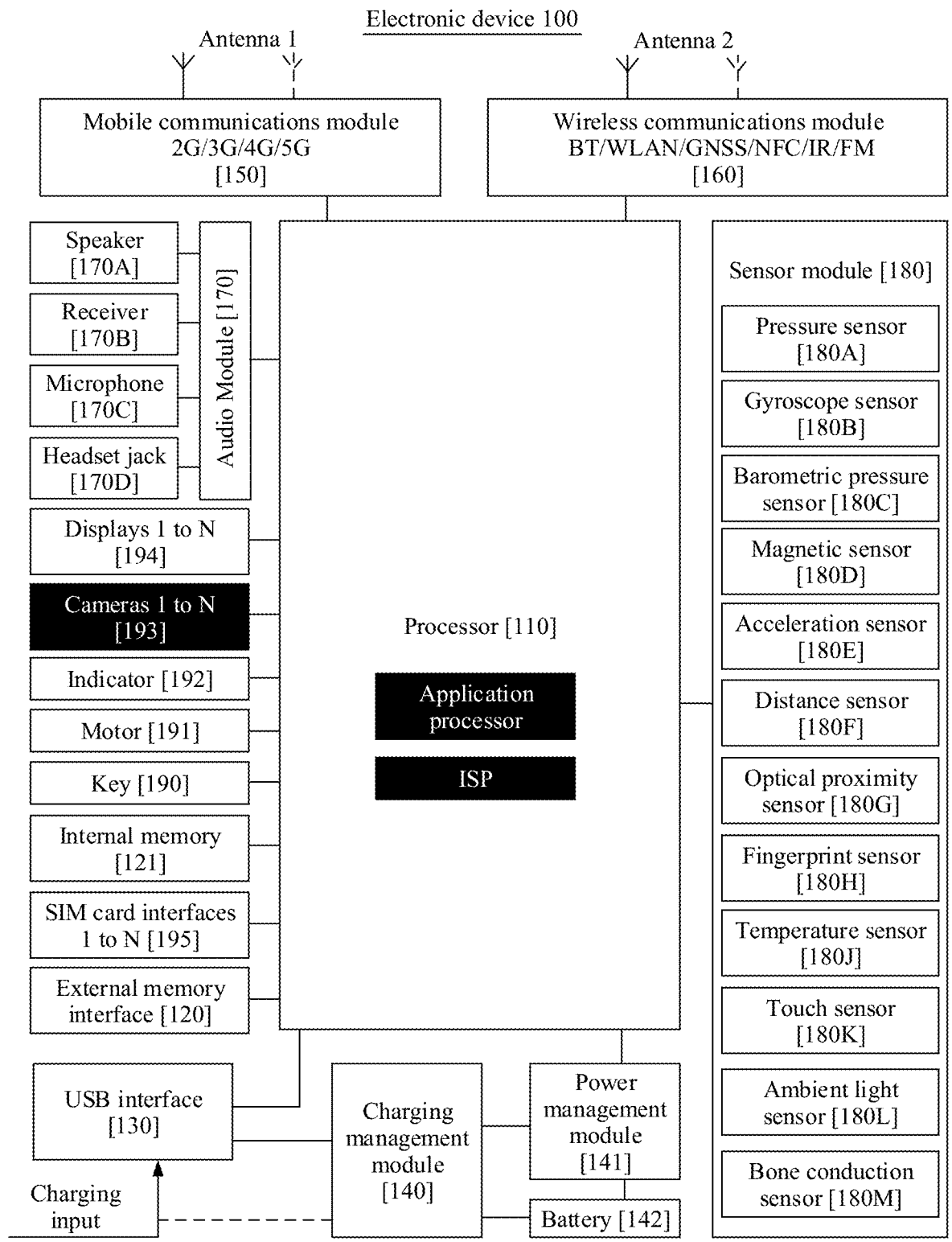
FIG. 1 is a schematic structural diagram 1 of an electronic device according to an embodiment of this application.

FIG. 1 is a schematic structural diagram of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present disclosure does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory, to avoid repeated access and reduce a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDL) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may further be configured as the I2C interface, the I2S interface, the UART interface, the MIPI interface, or the like.

The USB interface 130 is an interface that conforms to a USB standard specification, and may be, for example, a mini USB interface, a micro USB interface, a USB Type C interface, or the like. The USB interface 130 may be configured to connect to the charger to charge the electronic device 100, or may be configured to transmit data between the electronic device 100 and a peripheral device, or may be configured to connect to a headset, to play audio through the headset. The interface may be further configured to connect to another electronic device such as an AR device.

It may be understood that an interface connection relationship between the modules that is shown in this embodiment of the present disclosure is merely an example for description, and does not constitute a limitation on the structure of the electronic device 100. In some other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management unit 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the electronic device 100 may be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmits the electromagnetic wave to the modem processor for demodulation. The mobile communications module 150 may further amplify a signal modulated by the modem processor, and convert an amplified signal into an electromagnetic wave for radiation through the antenna 1. In some embodiments, at least a part of function modules in the mobile communications module 150 may be disposed in the processor 110. In some embodiments, at least some function modules of the mobile communications module 150 may be disposed in the same device as at least some modules of the processor 110.

The modem processor may include a modulator and a demodulator. The modulator is configured to modulate a to-be-sent low-frequency baseband signal into an intermediate signal or a high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in the same device as the mobile communications module 150 or another function module.

The wireless communications module 160 may provide a solution, applied to the electronic device 100, to wireless communication including a wireless local area network (WLAN) (for example, a wireless fidelity (Wi-Fi) network), Bluetooth (BT), a global navigation satellite system (GNSS), frequency modulation (FM), near field communication (NFC), infrared (IR) technology, and the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the electronic device 100 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

In some embodiments of this application, the electronic device 100 includes a long-focus camera, and generates an auxiliary preview image and a primary preview image based on an image captured by the long-focus camera. A viewfinder range of the auxiliary preview image is greater than a viewfinder range of the primary preview image, and the auxiliary preview image may be used to assist a user in determining the viewfinder range of the primary preview image. The image captured by the long-focus camera is cropped based on a zoom magnification currently used by the electronic device 100. A viewfinder range of a photo or video finally generated by the electronic device 100 is the same as that of the primary preview image. An exemplary technical solution is described in detail below.

In some other embodiments of this application, the electronic device 100 includes a long-focus camera, and a medium-focus camera or a short-focus (wide-angle) camera. The primary preview image is generated based on the long-focus camera, and the auxiliary preview image is generated based on the medium-focus camera or the short-focus (wide-angle) camera. It should be noted that the long-focus camera and the medium-focus camera (or the short-focus (wide-angle) camera) herein should be located on a same side of the electronic device 100, for example, located on a front side or a back side of a screen of the electronic device 100. The following describes in detail an exemplary technical solution.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, voice recognition, and text understanding, may be implemented through the NPU.

The external memory interface 120 may be configured to connect to an external memory card, for example, a Micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application program required by at least one function (for example, a voice playing function or an image playing function), and the like. The data storage area may store data (for example, audio data and a phone book) created in a process of using the electronic device 100, and the like. In addition, the internal memory 121 may include a high-speed random access memory, and may further include a nonvolatile memory, for example, at least one magnetic disk storage device, a flash memory device, or a universal flash storage (UFS). The processor 110 runs the instructions stored in the internal memory 121 and/or the instructions stored in the memory disposed in the processor, to perform various function applications of the electronic device 100 and data processing.

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be configured to listen to music or answer a call in a hands-free mode through the speaker 170A.

The receiver 170B, also referred to as an "earpiece", is configured to convert an audio electrical signal into a sound signal. When a call is answered or a voice message is received through the electronic device 100, the receiver 170B may be put close to a human ear to listen to a voice.

The microphone 170C, also referred to as a "mike" or a "microphone", is configured to convert a sound signal into an electrical signal. When making a call or sending a voice message, the user may make a sound near the microphone 170C through the mouth of the user, to input the sound signal to the microphone 170C. At least one microphone 170C may be disposed in the electronic device 100. In some other embodiments, two microphones 170C may be disposed in the electronic device 100, to implement a noise reduction function, in addition to collecting the sound signal. In some other embodiments, three, four, or more microphones 170C may alternatively be disposed in the electronic device 100, to collect a sound signal and reduce noise. The microphones may further recognize a sound source, to implement a directional recording function, and the like.

The headset jack 170D is configured to connect to a wired headset. The headset jack 170D may be the USB interface 130, or may be a 3.5 mm open mobile electronic device platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure strength based on a capacitance change. When a touch operation is performed on the display 194, the electronic device 100 detects strength of the touch operation by using the pressure sensor 180A. The electronic device 100 may also calculate a touch location based on a detection signal of the pressure sensor 180A. In some embodiments, touch operations that are performed in a same touch location but have different touch operation strength may correspond to different operation instructions. For example, when a touch operation whose touch operation strength is less than a first pressure threshold is performed on an SMS message application icon, an instruction for viewing an SMS message is executed. When a touch operation whose touch operation strength is greater than or equal to the first pressure threshold is performed on an SMS message application icon, an instruction for creating a new SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to perform image stabilization during photographing. For example, when the shutter is pressed, the gyroscope sensor 180B detects an angle at which the electronic device 100 shakes, and calculates, based on the angle, a distance for which a lens module needs to compensate, and allows the lens to eliminate the shake of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking upon opening of the clamshell is set based on a detected opening or closing state of the flip cover or a detected opening or closing state of the clamshell.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and applied to an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call, so that the electronic device 100 automatically turns off a screen to save power. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142, to avoid abnormal shutdown due to a low temperature.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. A visual output related to the touch operation may be provided by using the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch-sensitive key. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may have a same type or different types. The SIM card interface 195 may be compatible with different types of SIM cards. The SIM card interface 195 may also be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present disclosure, an Android system with the layered architecture is used as an example to illustrate a software structure of the electronic device 100.

Figure 2:
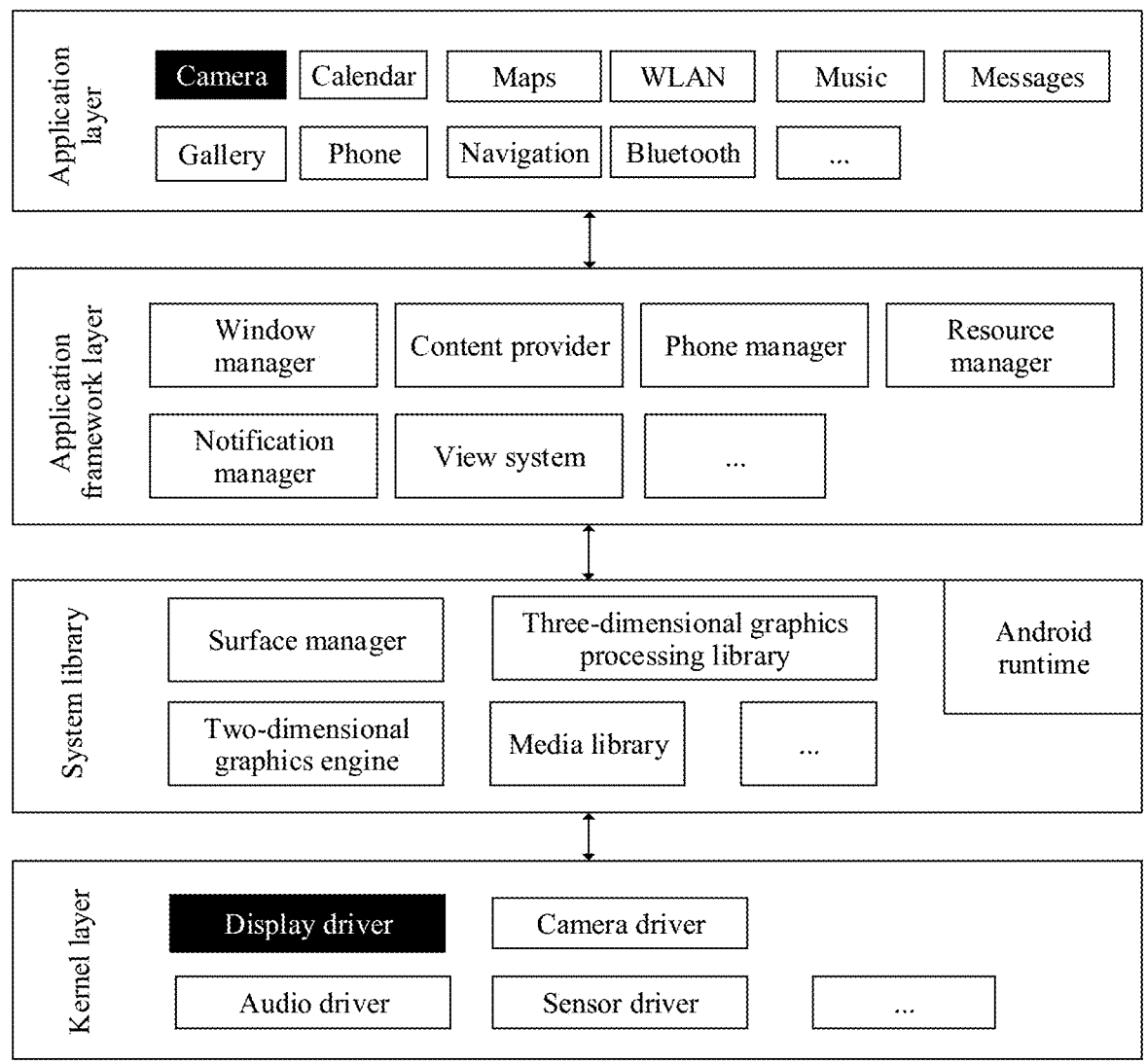
FIG. 2 is a schematic structural diagram 2 of an electronic device according to an embodiment of this application.

FIG. 2 is a block diagram of a software structure of the electronic device 100 according to an embodiment of the present disclosure.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 2, the application packages may include applications such as "camera", "gallery", "calendar", "phone", "maps", "navigation", "WLAN", "Bluetooth", "music", "videos", and "messages".

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including an SMS notification icon may include a text display view and an image display view.

The phone manager is configured to provide a communications function of the electronic device 100, for example, management of a call status (including answering or declining).

The resource manager provides, for an application, various resources such as a localized character string, an icon, an image, a layout file, and a video file.

The notification manager enables an application to display notification information in the status bar, and may be configured to convey a notification message. The notification manager may automatically disappear after a short pause without requiring a user interaction. For example, the notification manager is configured to provide notifications of download completing, a message prompt, and the like. The notification manager may be a notification that appears in a top status bar of the system in a form of a graph or a scroll bar text, for example, a notification of an application running on the background, or may be a notification that appears on the screen in a form of a dialog window. For example, text information is prompted in the status bar, a prompt tone is produced, the electronic device vibrates, or the indicator light blinks.

The Android runtime includes a core library and a virtual machine. The Android runtime is responsible for scheduling and management of the Android system.

The core library includes two parts: a function that needs to be invoked in java language, and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager, a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, a static image file, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. The camera application invokes an interface at the application framework layer to enable the camera application, then enables a camera driver by invoking the kernel layer, and captures a static image or a video through the camera 193.

All technical solutions in the following embodiments may be implemented on the electronic device 100 that has the foregoing hardware architecture and software architecture.

In this specification, an example in which the electronic device 100 is a mobile phone is used, and the technical solutions provided in the embodiments of this application are described in detail with reference to the accompanying drawings.

For example, a user may indicate the mobile phone to start a camera application by touching a specific control on a screen of the mobile phone, pressing a specific physical key or a key combination, entering a voice, or making an air gesture. In response to receiving the indication of the user to start the camera, the mobile phone starts the camera, and displays a photographing interface.

Figure 3:
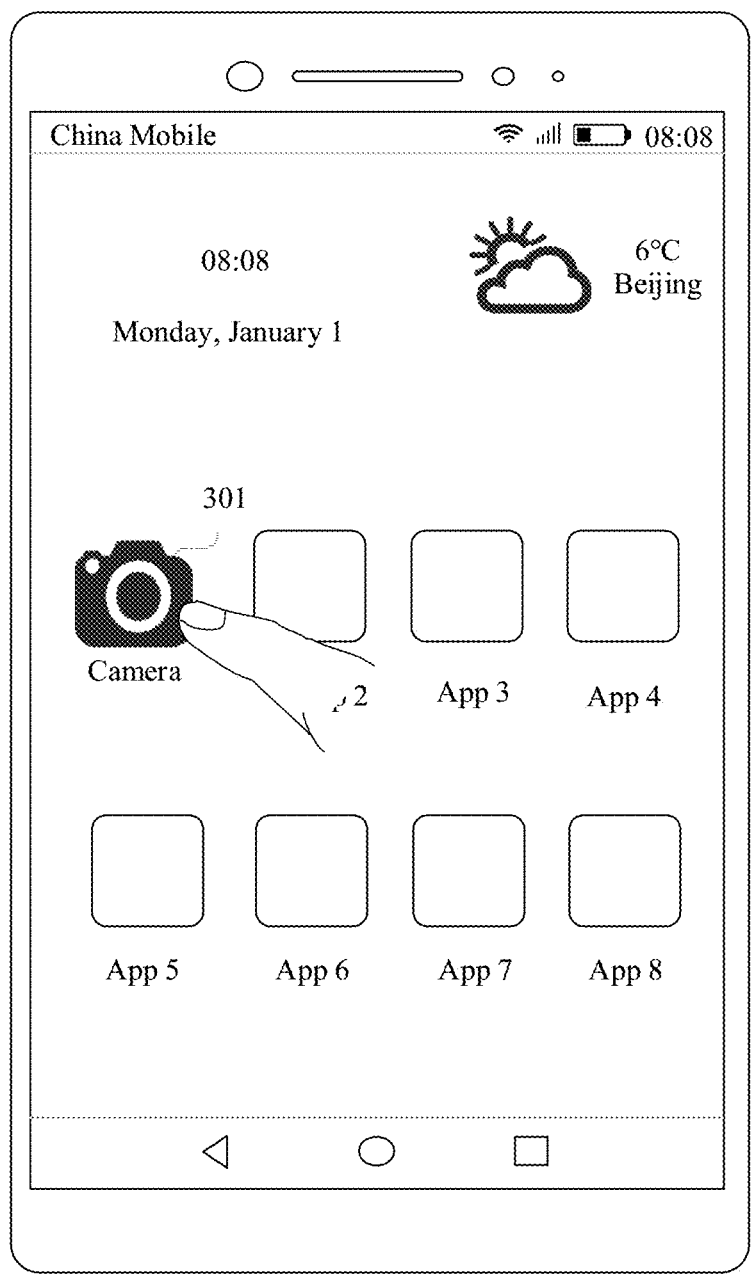
FIG. 3(1) to FIG. 3(4) are a schematic diagram of some user interfaces of an electronic device according to an embodiment of this application.
Figure 3:
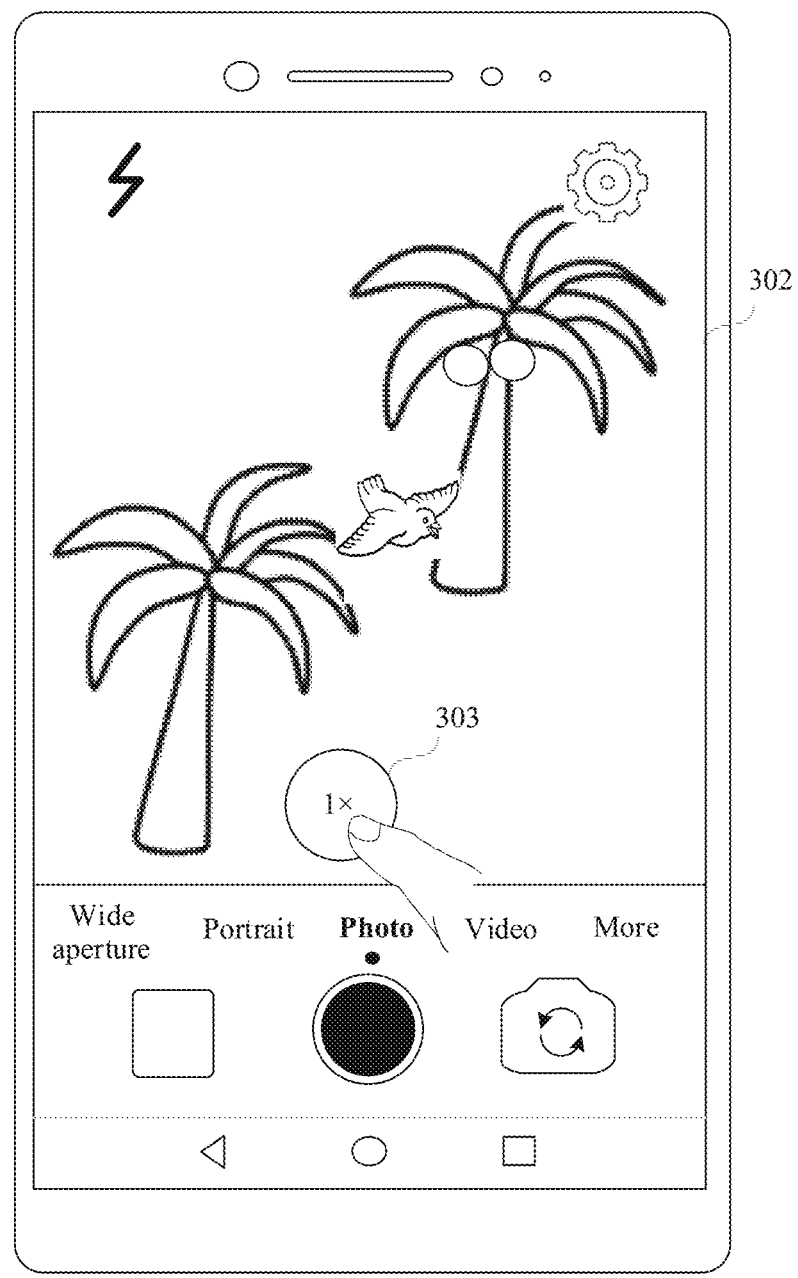
Figure 3:
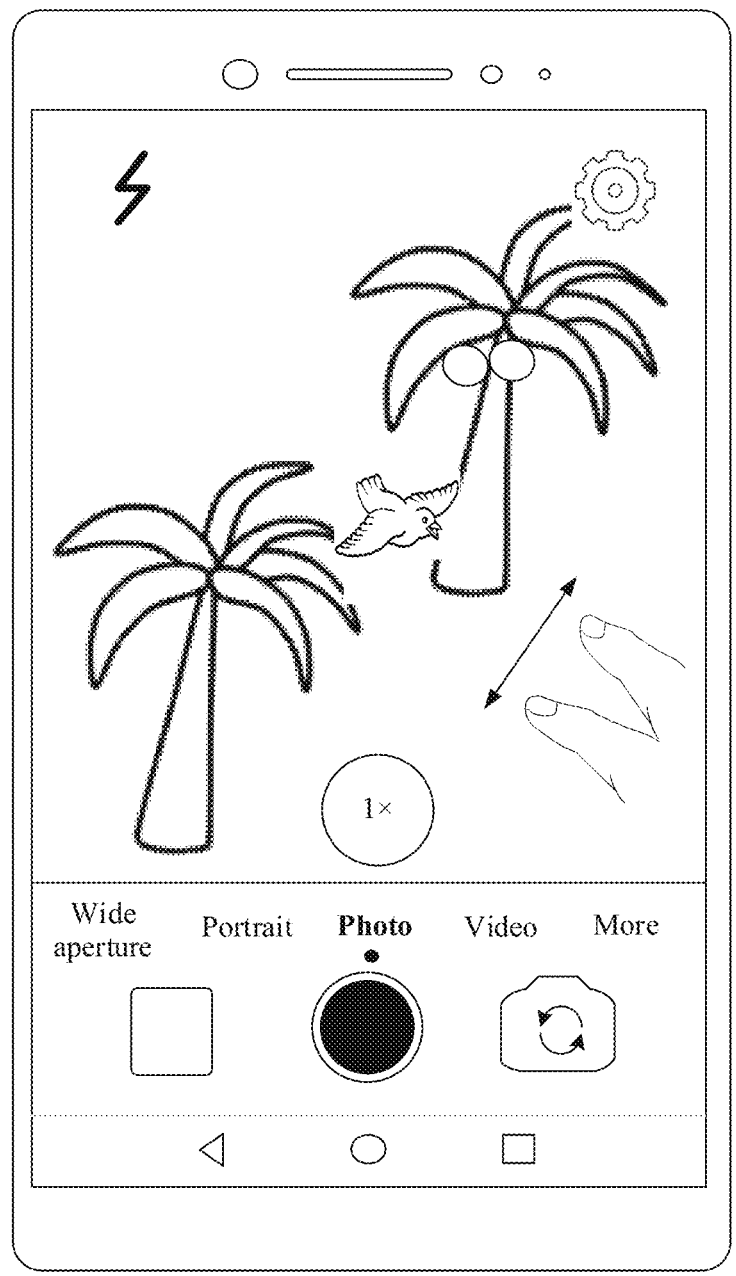
Figure 3:
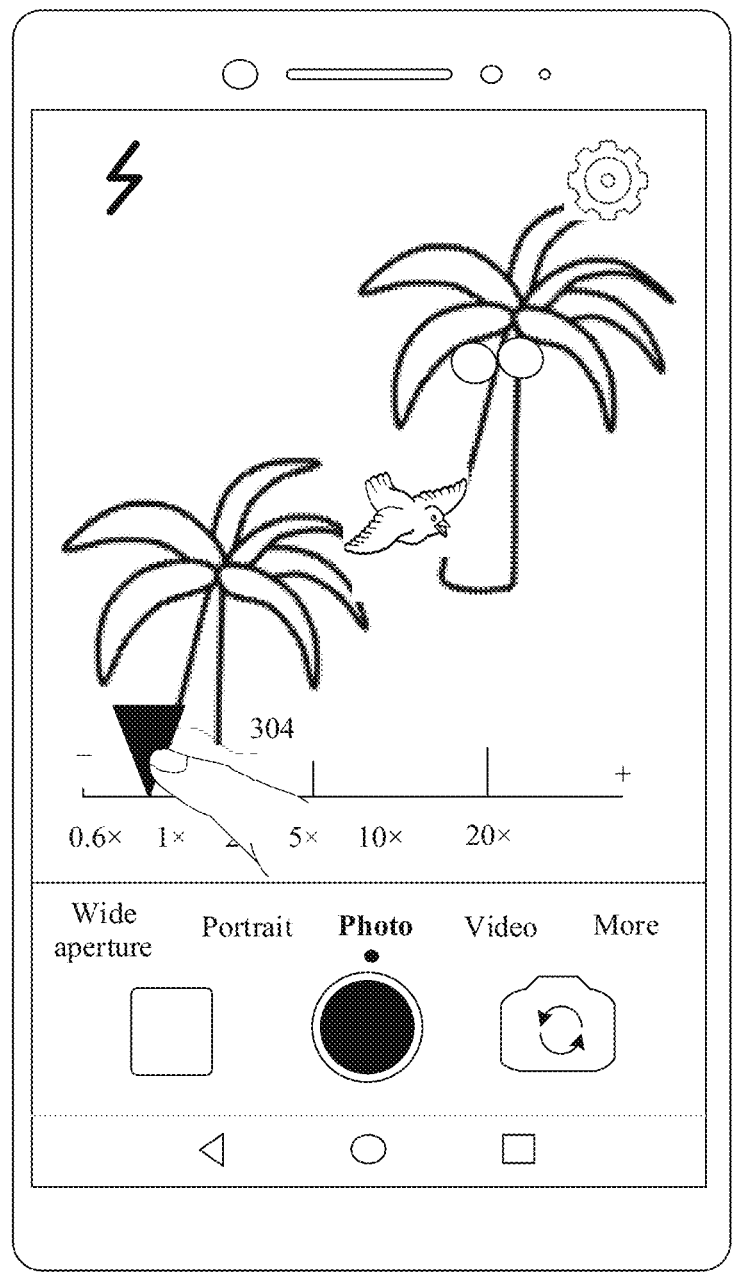

For example, as shown in FIG. 3(1), the user may tap a "camera" application icon 301 on a desktop of the mobile phone, to indicate the mobile phone to start the camera application, and the mobile phone displays a photographing interface shown in FIG. 3(2).

For another example, when the mobile phone is in a screen-locked state, the user may indicate, by using a gesture of swiping right on the screen of the mobile phone, the mobile phone to start the camera application, and the mobile phone may also display the photographing interface shown in FIG. 3(2).

Alternatively, when the mobile phone is in a screen-locked state, the user may tap a shortcut icon of the "camera" application on a lock screen interface, to indicate the mobile phone to start the camera application, and the mobile phone may also display the photographing interface shown in FIG. 3(2).

For another example, when the mobile phone is running another application, the user may tap a corresponding control to enable the mobile phone to start the camera application to take a photo. For example, when the user is using an instant messaging application (for example, a WeChat application), the user may alternatively indicate, by selecting a control of a camera function, the mobile phone to enable the camera application to take a photo and record a video.

As shown in FIG. 3(2), the photographing interface of the camera generally includes a first viewfinder frame 302, a photographing control, and other functional controls ("Wide Aperture", "Portrait", "Photo", "Video", and the like). The first viewfinder frame 302 may be configured to preview an image (or picture) captured by the camera. The user may determine, based on the image (or picture) in the first viewfinder frame 302, an occasion for indicating the mobile phone to perform a photographing operation. The user indicating the mobile phone to perform a photographing operation may be, for example, an operation in which the user taps a photographing control, or an operation in which the user presses a volume key. In some embodiments, the photographing interface may further include a zoom magnification indication 303. Usually, a default zoom magnification of the mobile phone is a basic zoom magnification, and is "1×".

The zoom magnification may be understood as a zoom-out/zoom-in ratio of a focal length of a current camera to a reference focal length. The reference focal length is usually a focal length of a primary camera of the mobile phone.

An example in which the mobile phone integrates three cameras: a short-focus (wide-angle) camera, a medium-focus camera, and a long-focus camera is used for description. When relative positions of the mobile phone and a photographed object remain unchanged, the short-focus (wide-angle) camera has a minimum focal length and a maximum field of view, and corresponds to a minimum size of an object in a photographed image. A focal length of the medium-focus camera is larger than that of the short-focus (wide-angle) camera, a field of view of the medium-focus camera is smaller than that of the short-focus (wide-angle) camera, and a size of an object in a photographed image of the medium-focus camera is larger than that of the short-focus (wide-angle) camera. The long-focus camera has a maximum focal length and a minimum field of view, and corresponds to a maximum size of an object in a photographed image.

The field of view is used to indicate a maximum angle range that can be photographed by the camera in a process of photographing an image by the mobile phone. That is, if a to-be-photographed object is within this angle range, the to-be-photographed object can be captured by the mobile phone. If the to-be-photographed object is outside the angle range, the photographed device cannot be captured by the mobile phone. Usually, a larger field of view of a camera indicates a larger photographing range of the camera, and a smaller field of view of a camera indicates a smaller photographing range of the camera. It may be understood that "field of view" may also be replaced with a term such as "vision scope", "view scope", "view area", "imaging range", or "imaging view".

Usually, the user uses the medium-focus camera in most scenarios. Therefore, the medium-focus camera is usually set as the primary camera. The focal length of the primary camera is set to the reference focal length, and the zoom magnification is set to "1×". In some embodiments, digital zoom may be performed on an image captured by the primary camera, that is, each pixel area of the "1×" image captured by the primary camera is enlarged by using an ISP or another processor in the mobile phone, and a viewfinder range of the image is correspondingly shrunk, so that a processed image is equivalent to an image photographed by using the primary camera at another zoom magnification (for example, "2×"). That is, the image photographed by using the primary camera may correspond to a zoom magnification range, for example, "1×" to "5×".

Similarly, the focal length of the long-focus camera divided by the focal length of the primary camera may be used as a zoom magnification of the long-focus camera. For example, the focal length of the long-focus camera may be 5 times the focal length of the primary camera, that is, the zoom magnification of the long-focus camera is "5×". Similarly, digital zoom may also be performed on an image captured by the long-focus camera. That is, the image photographed by using the long-focus camera may correspond to another zoom magnification range, for example, "5×" to "50×".

Similarly, the focal length of the short-focus (wide-angle) camera divided by the focal length of the primary camera may be used as a zoom magnification of the short-focus (wide-angle) camera. For example, the focal length of the short-focus camera may be 0.5 times the focal length of the primary camera, that is, the zoom magnification of the long-focus camera is "0.5×". Similarly, digital zoom may also be performed on an image captured by the short-focus (wide-angle) camera. That is, the image photographed by using the long-focus camera may correspond to another zoom magnification range, for example, "0.5×" to "1×".

Certainly, the mobile phone may use any one of the cameras as the primary camera, and use the focal length of the primary camera as the reference focal length. This is not specifically limited in this application.

In some embodiments, the user may manually adjust a zoom magnification used when the mobile phone performs photographing.

For example, as shown in FIG. 3(2), the user may adjust the zoom magnification used by the mobile phone by operating a zoom magnification indicator 303 on the photographing interface. For example, when a zoom magnification currently used by the mobile phone is "1×", the user may tap the zoom magnification indication 303 for one or more times, so that the zoom magnification used by the mobile phone is changed to "5×", that is, the mobile phone displays a photographing interface shown in FIG. 4(1). On the photographing interface shown in FIG. 4(1), a viewfinder range of an image previewed in a first viewfinder frame 401 is clearly smaller than a viewfinder range in a first viewfinder frame 302 in FIG. 3(2), but a size of a photographed object (for example: a bird) previewed in the first viewfinder frame 401 is greater than that of a photographed object previewed in the first viewfinder frame 302. In some examples, a zoom magnification indication 402 may be further displayed on a photographing interface in FIG. 4. In this case, the current zoom magnification is displayed as "5×", so that the user knows the current zoom magnification.

For another example, as shown in FIG. 3(3), the user may reduce the zoom magnification used by the mobile phone by using a gesture of pinching by two fingers (or three fingers) on the photographing interface, or increase the zoom magnification used by the mobile phone by using a gesture of swiping outward (in an opposite direction to pinching) with two fingers (or three fingers).

For another example, as shown in FIG. 3(4), the user may also change the zoom magnification used by the mobile phone by dragging a slider on a zoom ruler 304 on the photographing interface.

For another example, the user may also change the zoom magnification of the mobile phone by switching a currently used camera on the photographing interface or a photographing settings interface. For example, if the user chooses to switch to the long-focus camera, the mobile phone automatically increases the zoom magnification.

For another example, the user may also change the zoom magnification of the mobile phone by selecting an option of a long-focus photographing scenario, an option of a remote photographing scenario, or the like on the photographing interface or the photographing settings interface.

In some other embodiments, the mobile phone may also automatically identify a specific scenario of an image captured by the camera, and automatically adjust the zoom magnification based on the identified specific scenario. For example, if the mobile phone identifies that the image captured by the camera is a scene with a large view scope, for example, the sea, a mountain, or a forest, the zoom magnification may be automatically reduced. For another example, if the mobile phone identifies that the image captured by the camera is a distant object, for example, a distant bird or an athlete on a sports field, the zoom magnification may be automatically increased. This is not limited in this application.

In this application, when the zoom magnification used by the mobile phone is relatively high, for example, when the zoom magnification is greater than or equal to a first preset magnification (for example, "10×"), in addition to displaying a preview image (or a preview picture) in a first viewfinder frame on the photographing interface of the mobile phone, a preview image (or a preview picture) in a second viewfinder frame may be further displayed. The preview image in the second viewfinder frame may assist the user in determining a viewfinder range of the first viewfinder frame. For ease of differentiation, the preview image (or the preview picture) displayed in the first viewfinder frame is referred to as a primary preview image (or a primary preview picture), and the preview image (or the preview picture) displayed in the second viewfinder frame is referred to as an auxiliary preview image (an auxiliary preview picture).

It is clearly that a field of view of an image (the primary preview image) in the second viewfinder frame is greater than an image (the auxiliary preview image) in the second viewfinder frame, and the image in the second viewfinder frame includes the image in the first viewfinder frame. Because a zoom magnification of the first viewfinder frame is relatively large, the viewfinder range is small, and it is not convenient for the user to perform framing composition. Alternatively, when the to-be-photographed object is in a moving state, it is very likely that the to-be-photographed object moves beyond the viewfinder range of the first viewfinder frame, and it is not convenient for the user to track and photograph the to-be-photographed object. Therefore, the user may perform framing composition by using the second viewfinder frame with a relatively large viewfinder range, and this facilitates tracking and photographing of the to-be-photographed object in motion.

The first viewfinder frame and the second viewfinder frame may partially overlap on the screen of the mobile phone, or may not overlap. A relative location relationship between the first viewfinder frame and the second viewfinder frame is not limited in this application.

Figure 4:
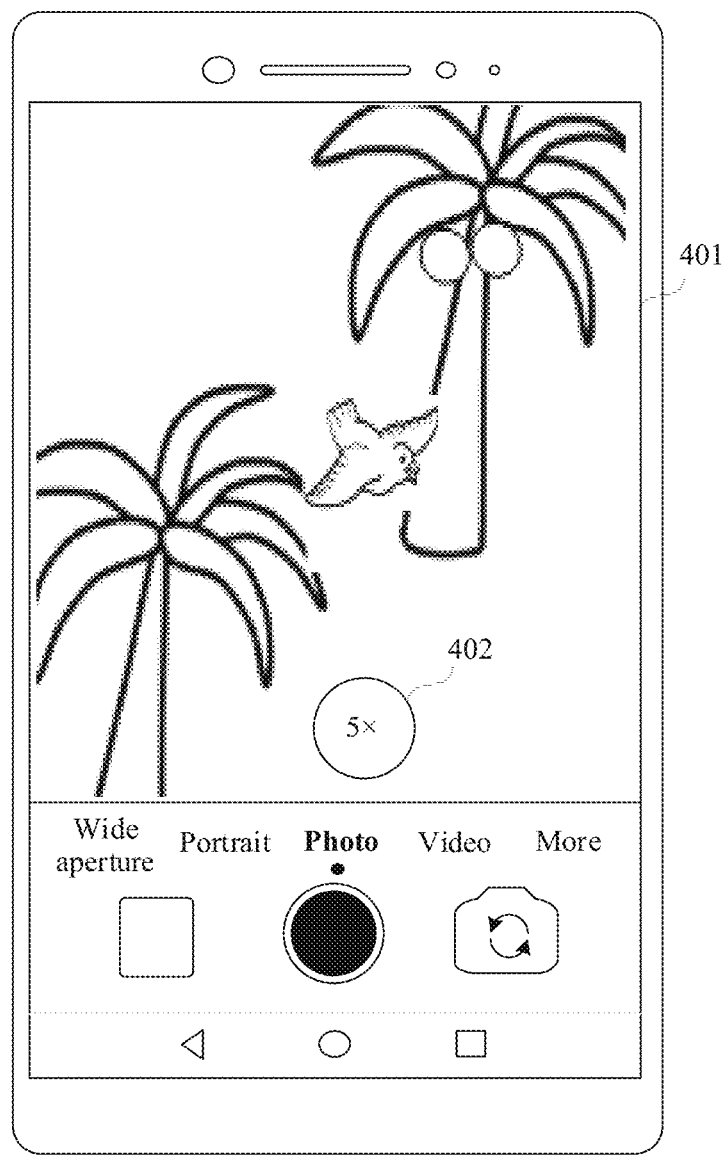
FIG. 4(1) to FIG. 4(3) are a schematic diagram of still some user interfaces of an electronic device according to an embodiment of this application.
Figure 4:
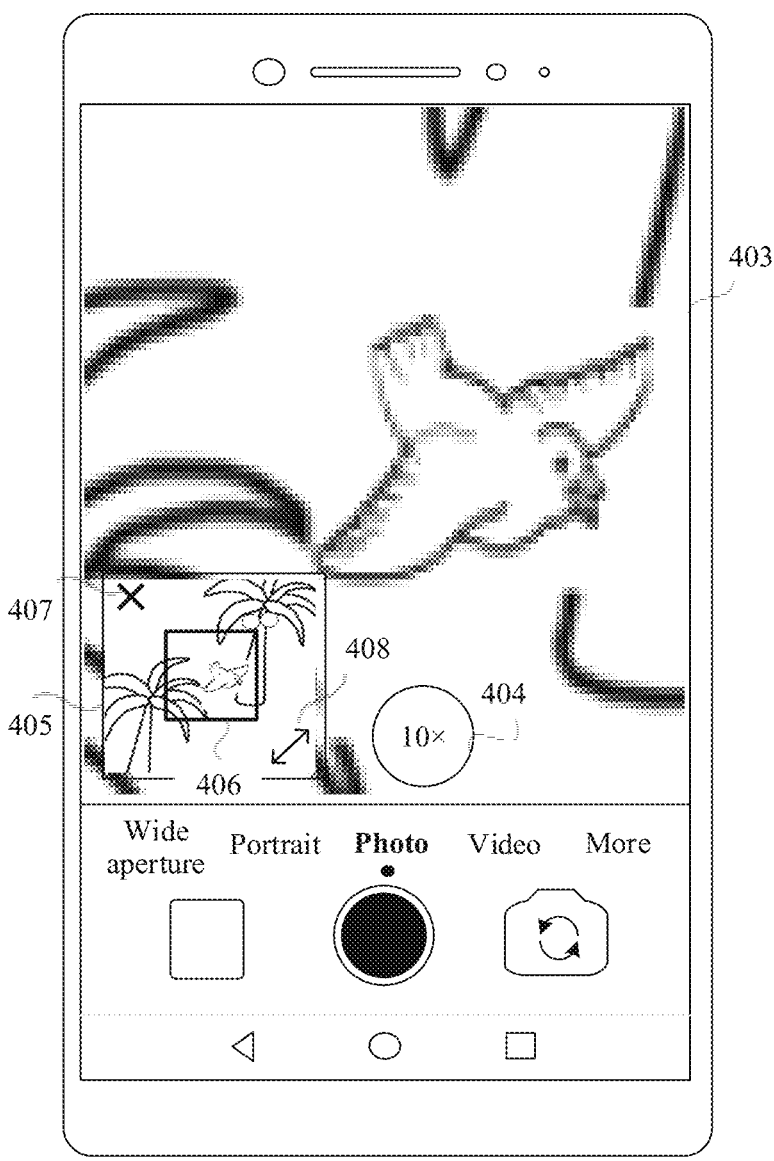
Figure 4:
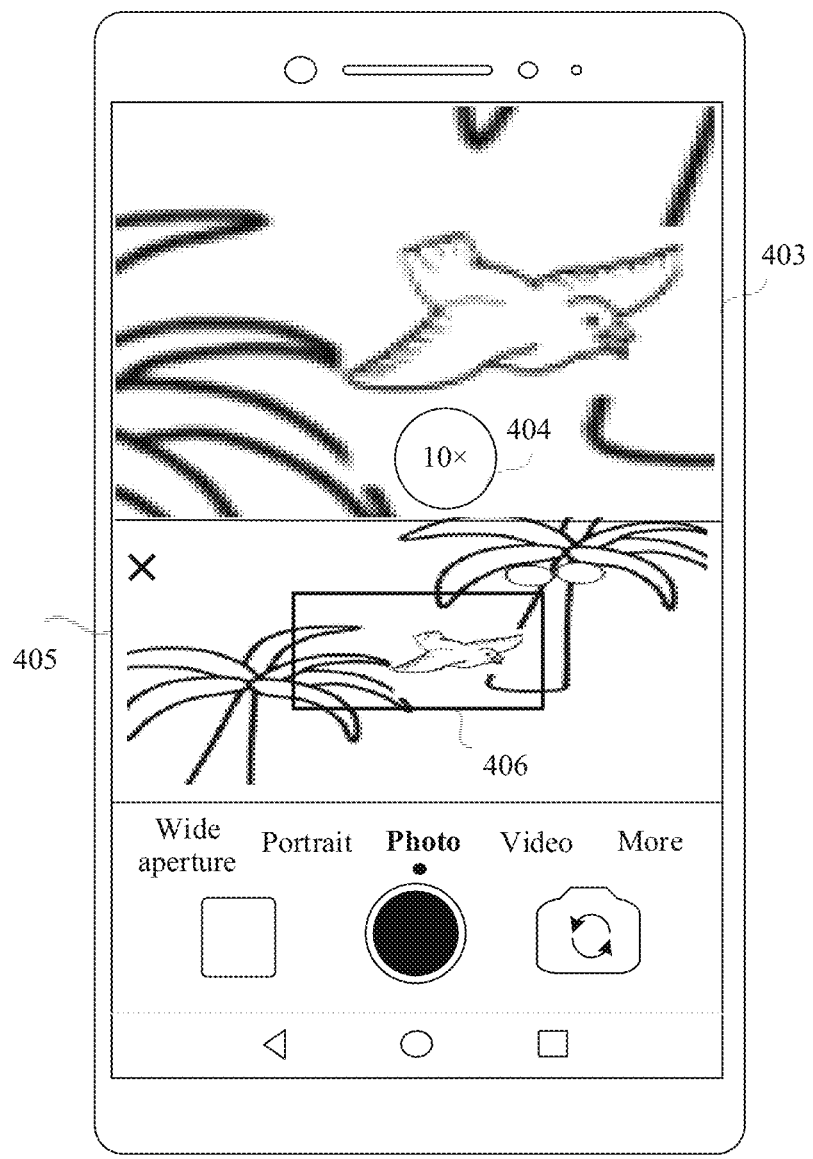

For example, as shown in FIG. 4(1), the current zoom magnification displayed on the photographing interface of the mobile phone is "5×", and in this case, only the first viewfinder frame 401 is displayed on the photographing interface. When an indication that the user increases the zoom magnification (for example, the zoom magnification is increased to "10×") is detected, the mobile phone displays a photographing interface shown in FIG. 4(2). On the photographing interface shown in FIG. 4(2), in addition to a first viewfinder frame 403, a second viewfinder frame 405 is further displayed. It can be learned that a primary preview image displayed in the first viewfinder frame 403 is a part of an auxiliary preview image displayed in the second viewfinder frame 405. For example, the primary preview image is an image in a central area (or an approximately central area) of the auxiliary preview image. An image in the second viewfinder frame 405 may include a first marker frame 406, to prompt the user a location of an image in the first viewfinder frame 403 in the image in the second viewfinder frame 405, so that the user performs framing composition on the image in the first viewfinder frame 403 by using the second viewfinder frame 405, and photographs a moving object.

In an example, as shown in FIG. 4(2), the first viewfinder frame 403 and the second viewfinder frame 405 may partially overlap. For example, the first viewfinder frame 403 may occupy most or all of a display area of the screen of the mobile phone. The second viewfinder frame 405 may be superimposed on the first viewfinder frame 403, and is located at an edge position, for example, a lower left corner, a lower right corner, an upper left corner, or an upper right corner, in the first viewfinder frame 403. In this way, the second viewfinder frame does not block a central area of the first viewfinder frame, thereby avoiding blocking an area concerned by the user. Certainly, the user may freely move a display position of the second viewfinder frame by performing an operation such as dragging, so that sometimes the user needs to view image content at an edge position in the first viewfinder frame, or meet use habits of different users, use habits of the user at different times, or the like.

Optionally, when the second viewfinder frame 405 is superimposed on the first viewfinder frame 403 and is located at the edge position in the first viewfinder frame 403, the second viewfinder frame 405 may also be displayed in a translucent form. In this case, the second viewfinder frame 405 may present an auxiliary preview image of a larger viewfinder range, and does not block an image in the first viewfinder frame 403 in the area.

Optionally, the second viewfinder frame 405 may further include a close control 407. The user may close the second viewfinder frame 405 by operating the close control 407, that is, the mobile phone no longer displays the second viewfinder frame 405 on the photographing interface. In some examples, after the user manually closes the second viewfinder frame 405, the mobile phone may display a restoration control at a position at which the second viewfinder frame 405 is originally displayed or at another position. Alternatively, the user may resume displaying the second viewfinder frame 405 by operating the restoration control. For example, the restoration control may be suspended on the first viewfinder frame 403 in a translucent form. A specific form of the restoration control is not limited in this application.

Optionally, the second viewfinder frame 405 may further include a scale control 408. When detecting that the user operates the scale control 408, the mobile phone may enlarge the second viewfinder frame 405, or the mobile phone displays only the second viewfinder frame 405 at this time. In this way, the user can more clearly view the auxiliary preview image in the second viewfinder frame 405, and may perform framing composition based on the auxiliary preview image. When the second viewfinder frame 405 is in an enlarged state, when it is detected again that the user operates the scale control 408, the mobile phone scales down the second viewfinder frame 405. In this way, the user can view the primary preview image in the first viewfinder frame 403. It can be learned that, in this application, the primary preview image and the auxiliary preview image may be flexibly displayed in various ways based on a use scenario of the user.

Certainly, in the foregoing example, display positions of the first viewfinder frame 403 and the second viewfinder frame 405 may also be exchanged. That is, the second viewfinder frame 405 occupies most or all of the display area of the screen of the mobile phone, and the first viewfinder frame 403 is superimposed on the second viewfinder frame 405, and is located at an edge position in the second viewfinder frame 405. In addition, the mobile phone may flexibly arrange positions of the first viewfinder frame 403 and the second viewfinder frame 405 according to a selection of the user. For example, the user may indicate the mobile phone to exchange the positions of the second viewfinder frame 405 and the first viewfinder frame 403 by dragging the second viewfinder frame 405 to the position of the first viewfinder frame 403. For another example, when detecting a touch and hold operation performed by the user on a boundary of the second viewfinder frame 405, or detecting that a finger of the user moves to the boundary of the second viewfinder frame 405, the mobile phone may display a switching control (not shown in the figure), and when detecting that the user operates the switching control, the mobile phone exchanges the positions of the second viewfinder frame 405 and the first viewfinder frame 403, and the like.

In another example, as shown in FIG. 4(3), the first viewfinder frame 403 and the second viewfinder frame 405 may not overlap. For example, the display area of the mobile phone may be divided into two non-overlapping areas (for example, upper and lower areas, left and right areas, and the like), sizes of the two areas may be the same or different, and the two areas are respectively used to display the first viewfinder frame 403 and the second viewfinder frame 405. Optionally, the display positions of the first viewfinder frame 403 and the second viewfinder frame 405 may be exchanged according to an operation of the user.

Certainly, the mobile phone may also automatically select different area division methods in different mobile phone modes. The mobile phone mode includes a landscape mode or a portrait mode. For example, when the mobile phone is in the landscape mode, the display area of the mobile phone is divided into left and right areas, and the left and right areas are respectively used to display the first viewfinder frame 403 and the second viewfinder frame 405. When the mobile phone is in the portrait mode, the display area of the mobile phone is divided into upper and lower areas, and the upper and lower areas are respectively used to display the first viewfinder frame 403 and the second viewfinder frame 405. In another example, when the mobile phone has a foldable display, the mobile phone mode further includes a folded mode or an expanded mode. When the mobile phone is in the folded mode, the display area of the mobile phone is divided into upper and lower areas, and the upper and lower areas are respectively used to display the first viewfinder frame 403 and the second viewfinder frame 405. When the mobile phone is in the expanded mode, the display area of the mobile phone is divided into left and right areas, and the left and right areas are respectively used to display the first viewfinder frame 403 and the second viewfinder frame 405. This is not specifically limited in this application.

The following describes an exemplary implementation solution in which the first viewfinder frame and the second viewfinder frame are simultaneously displayed on the photographing interface of the mobile phone.

In a technical solution, images in the first viewfinder frame and the second viewfinder frame may be images captured by a same camera, for example, images captured by the long-focus camera.

For example, the image displayed in the first viewfinder frame is an image obtained after processing is performed based on an original image captured by the long-focus camera and based on the zoom magnification currently used by the mobile phone. For example, if the zoom magnification currently used by the mobile phone is "10×", the mobile phone first crops, based on the original image (for example, a zoom magnification of the original image is "5×") captured by the long-focus camera in a software processing manner of digital zoom, the original image captured by the long-focus camera, to obtain an image whose zoom magnification is "10×". That is, the image displayed in the first viewfinder frame is the image whose zoom magnification is "10×", and a viewfinder range (or a field of view) of the image is less than a viewfinder range (or a field of view) of the original image captured by the long-focus camera.

The image displayed in the second viewfinder frame is an image obtained after processing is performed based on the original image captured by the long-focus camera. In an example, the image in the second viewfinder frame is a full-size image of the original image captured by the long-focus camera, that is, the mobile phone does not crop the original image captured by the long-focus camera. In other words, the zoom magnification of the original image captured by the long-focus camera is not changed. For example, if the zoom magnification of the original image captured by the long-focus camera is "5×", the zoom magnification of the image displayed in the second viewfinder frame is "5×".

Optionally, because the image in the second viewfinder frame is only used to assist the user in determining the viewfinder range of the first viewfinder frame, resolution of the second viewfinder frame may be properly reduced. Therefore, downsampling may be performed on the original image captured by the long-focus camera to obtain a low-resolution image, and the low-resolution image is displayed in the second viewfinder frame.

The image in the second viewfinder frame may further include a first marker frame, configured to mark, in the second viewfinder frame, the image in the first viewfinder frame, so as to prompt the user a location of the image in the first viewfinder frame in the image in the second viewfinder frame. In this way, when the user performs framing composition on the image in the first viewfinder frame, composition design may be performed based on more scenes displayed in the second viewfinder frame with a larger field of view. Alternatively, when the to-be-photographed object of the user moves beyond the viewfinder range of the first viewfinder frame, the user can move the mobile phone based on a location of the to-be-photographed object in the second viewfinder frame, so that the to-be-photographed object can return to the viewfinder range of the first viewfinder frame, so that the user can track and photograph the to-be-photographed object. These exemplary scenarios are described in detail later, and are not described herein.

Optionally, a marking manner of the first marker frame may be different from a marking manner of the second viewfinder frame, for example, a color of the viewfinder frame is different, so that the user more clearly distinguishes content marked by the first marker frame.

In this technical solution, assuming that a zoom magnification corresponding to the image in the second viewfinder frame is K1, and a zoom magnification corresponding to the image in the first viewfinder frame is K2, an area of an image in the first marker frame/an area of the image in the second viewfinder frame=$(K1/K2)^2$. For example, if the zoom magnification corresponding to the second viewfinder frame is "5×", and the zoom magnification currently used by the mobile phone is "10×", the area of the image in the first marker frame is one quarter of the area of the image in the second viewfinder frame. For example, if a size of the image in the second viewfinder frame is 320 pixels×240 pixels, a size of the image in the first marker frame is 160 pixels×120 pixels. For another example, if the zoom magnification corresponding to the second viewfinder frame is "5×", and the zoom magnification currently used by the mobile phone is "50×", the area of the image in the first marker frame is 1% of the area of the image in the second viewfinder frame. For example, if the size of the image in the second viewfinder frame is 320 pixels×240 pixels, the size of the image in the first marker frame is 32 pixels×24 pixels.

In addition, a central position of the image in the first marker frame coincides with or approximately coincides with a central position of the image in the second viewfinder frame.

Optionally, when the mobile phone is in a high-magnification photographing scenario, the mobile phone may alternatively process the image in the first viewfinder frame by using an electronic image stabilization (EIS) technology. In this case, when a position of the first marker frame is determined in the image in the second viewfinder frame, a current offset caused by hand shake further needs to be compensated, so as to ensure that a field of view of the image in the first marker frame is consistent with that of the image in the first viewfinder frame.

The foregoing exemplary method for performing digital zoom and electronic image stabilization on an image may be processed by using any method that can be thought of by a person skilled in the art. This is not specifically limited in this application.

It can be learned that, in this example, a zoom magnification of the auxiliary preview image in the second viewfinder frame does not change, and an area of the first marker frame in the second viewfinder changes as the zoom magnification currently used by the mobile phone changes. For example, the area of the first marker frame is inversely proportional to the zoom magnification currently used by the mobile phone (that is, a zoom magnification of the primary preview image). In this case, as the zoom magnification currently used by the mobile phone increases, the area of the first marker frame decreases.

In another example, when the zoom magnification of the mobile phone is switched to be greater than a second preset magnification (for example, "20×"), and the second preset magnification is greater than or equal to the first preset magnification, the image in the second viewfinder frame may be an image obtained after the original image captured by the long-focus camera is cropped. In other words, the image in the second viewfinder frame is an image with a relatively large zoom magnification that may be obtained by performing digital zoom processing on the original image captured by the long-focus camera. However, the zoom magnification of the image in the second viewfinder frame is usually less than the zoom magnification currently used by the mobile phone. In this way, compared with the original image captured by the long-focus camera, the zoom magnification of the image in the second viewfinder frame is closer to the zoom magnification of the image in the first viewfinder frame, and a viewfinder range is closer. This helps the user more accurately determine a to-be-photographed object in the first viewfinder frame based on the image in the second viewfinder frame. For example, when the zoom magnification of the mobile phone is switched to "20×", an ISP or a processor of the mobile phone performs digital conversion on the original image (the zoom magnification is "5×") captured by the long-focus camera, to obtain an image with a relatively large zoom magnification (for example, "10×"), and the image with a relatively large zoom magnification is displayed in the second viewfinder frame.

Optionally, the image in the second viewfinder frame may alternatively be a low-resolution image (compared with the original image captured by the long-focus camera). For a processing method, refer to descriptions of related content in the foregoing example. Details are not described herein.

The image in the second viewfinder frame may further include the first marker frame, configured to mark, in the second viewfinder frame, the image in the first viewfinder frame. For other content, refer to descriptions of related content in the foregoing example. Details are not described herein again.

It can be learned that, in this example, the zoom magnification of the auxiliary preview image in the second viewfinder frame may change as the zoom magnification currently used by the mobile phone changes. In this case, as the zoom magnification currently used by the mobile phone increases, the area of the first marker frame in the second viewfinder frame may not change.

In another technical solution, the images in the first viewfinder frame and the second viewfinder frame may alternatively be images captured by different cameras (for example, different rear cameras) on a same side of the mobile phone. For example, the image in the first viewfinder frame is an image captured by the long-focus camera, and the image in the second viewfinder frame is an image captured by the primary camera or the wide-angle camera.

The image displayed in the first viewfinder frame is the image obtained after processing is performed based on the original image captured by the long-focus camera and based on the zoom magnification currently used by the mobile phone. Processing of the image displayed in the first viewfinder frame is the same as that in the first technical solution, and details are not described herein again.

The image displayed in the second viewfinder frame is an image obtained after processing is performed based on an original image captured by the primary camera or the wide-angle camera. The primary camera is used as an example for description.

In an example, the image in the second viewfinder frame is a full-size image of the original image captured by the primary camera, that is, the mobile phone does not crop the original image captured by the primary camera. In other words, zoom magnification conversion is not performed on the original image captured by the primary camera. For example, if the zoom magnification of the original image captured by the primary camera is "1×", the zoom magnification of the image displayed in the second viewfinder frame is "1×".

Optionally, because the image in the second viewfinder frame is only used to assist the user in determining the viewfinder range of the first viewfinder frame, resolution of the second viewfinder frame may be properly reduced. Therefore, downsampling may be performed on the original image captured by the primary camera to obtain a low-resolution image, and the low-resolution image is displayed in the second viewfinder frame.

The image in the second viewfinder frame may further include the first marker frame, configured to mark, in the second viewfinder frame, the image in the first viewfinder frame, so as to prompt the user the location of the image in the first viewfinder frame in the image in the second viewfinder frame.

In this technical solution, assuming that the zoom magnification corresponding to the image in the second viewfinder frame is K1, and the zoom magnification corresponding to the image in the first viewfinder frame is K2, the area of the image in the first marker frame/the area of the image in the second viewfinder frame=$(K1/K2)^2$. For example, if the zoom magnification corresponding to the second viewfinder frame is "1×", and the zoom magnification currently used by the mobile phone is "10×", the area of the image in the first marker frame is 1% of the area of the image in the second viewfinder frame. For example, if the size of the image in the second viewfinder frame is 320 pixels×240 pixels, the size of the image in the first marker frame is 32 pixels×24 pixels.

In addition, the central position of the image in the first marker frame approximately coincides with the central position of the image in the second viewfinder frame. Because the image in the first viewfinder frame is obtained by using the image captured by the long-focus camera, the image in the second viewfinder frame is obtained by using the image captured by the primary camera, and locations of the long-focus camera and the primary camera on the mobile phone are different, the central position of the image in the first marker frame may be adjusted based on a relative distance between the long-focus camera and the primary camera, so that the field of view of the image in the first marker frame is consistent with that of the image in the first viewfinder frame. Certainly, when the mobile phone processes the image in the first viewfinder frame by using the EIS technology, when the location of the first marker frame is determined in the image in the second viewfinder frame, the current offset caused by hand shake further needs to be compensated.

It can be learned that, in this example, the zoom magnification of the auxiliary preview image in the second viewfinder frame does not change, and the area of the first marker frame in the second viewfinder changes as the zoom magnification currently used by the mobile phone changes. For example, the area of the first marker frame is inversely proportional to the zoom magnification currently used by the mobile phone. In this case, as the zoom magnification currently used by the mobile phone increases, the area of the first marker frame decreases.

In another example, when the zoom magnification of the mobile phone is switched to be greater than the second preset magnification (for example, "20×"), and the second preset magnification is greater than or equal to the first preset magnification, the image in the second viewfinder frame may be an image obtained after the original image captured by the primary camera is cropped. In other words, the image in the second viewfinder frame is the image with a relatively large zoom magnification that may be obtained by performing digital zoom processing on the original image captured by the primary camera. However, the zoom magnification of the image in the second viewfinder frame is usually less than the zoom magnification currently used by the mobile phone. In this way, compared with the original image captured by the primary camera, the zoom magnification of the image in the second viewfinder frame is closer to the zoom magnification of the image in the first viewfinder frame, and the viewfinder range is closer. This helps the user more accurately determine the to-be-photographed object in the first viewfinder frame based on the image in the second viewfinder frame. For example, when the zoom magnification of the mobile phone is switched to "20×", the ISP or the processor of the mobile phone performs digital conversion on the original image (the zoom magnification is "1×") captured by the primary camera, to obtain the image with a relatively large zoom magnification (for example, "5×"), and the image with a relatively large zoom magnification is displayed in the second viewfinder frame. For other content, refer to descriptions of related content in the foregoing example. Details are not described again.

It can be learned that, in this example, the zoom magnification of the auxiliary preview image in the second viewfinder frame may change as the zoom magnification currently used by the mobile phone changes. In this case, as the zoom magnification currently used by the mobile phone increases, the area of the first marker frame in the second viewfinder frame may not change.

In some embodiments of this application, the mobile phone refreshes, at a specific frequency, the images displayed in the first viewfinder frame and the second viewfinder frame. The mobile phone also keeps monitoring the zoom magnification of the primary preview image. When detecting that the zoom magnification of the primary preview image changes within a range greater than the first preset magnification, the mobile phone automatically adjusts a size of the first marker frame in the auxiliary preview image, and keeps refreshing preview images in the first viewfinder frame and the second viewfinder frame. When detecting that the zoom magnification is less than the first preset magnification, the mobile phone may automatically close the auxiliary preview image displayed in the second viewfinder frame 405, and keeps refreshing the preview image in the first viewfinder frame.

In still some embodiments of this application, when the mobile phone detects an operation in which the user closes the auxiliary preview image in the second viewfinder frame, the mobile phone closes the auxiliary preview image. In other words, in a current photographing process of the mobile phone, even if the zoom magnification of the mobile phone is greater than or equal to the first preset magnification, the mobile phone does not open the auxiliary preview image in the second viewfinder frame. This photographing process may be considered as a process from enabling the camera application on the mobile phone this time to exiting the camera application or powering off and restarting the mobile phone (including a case in which the camera is running in the background). After the mobile phone exits the camera application or restarts after the mobile phone is powered off, when the mobile phone enables the camera application again, it may be considered as a next photographing process of the mobile phone.

In still some embodiments of this application, when the mobile phone detects that a quantity of times that the user closes the auxiliary preview image in the second viewfinder frame reaches a preset quantity of times, the mobile phone may also close the auxiliary preview image function of the mobile phone by default. That is, after the mobile phone exits the camera application and restarts the camera application, the mobile phone no longer displays the auxiliary preview image in the second viewfinder frame. In some examples, the auxiliary preview image function may be enabled again by restoring the mobile phone to its factory settings.

In still some embodiments of this application, the mobile phone may also set an on/off control for the auxiliary preview image function. The user can freely choose to enable or disable the auxiliary preview image function at a high magnification. For example, the on/off control for the auxiliary preview image may be set in an option of a settings application. For another example, the on/off control for the auxiliary preview image may be set in settings of the camera application. For another example, the on/off control for the auxiliary preview image may be set on the photographing interface of the camera. A specific form and location of the on/off control for the auxiliary preview image function are not limited in this application. Certainly, the user may further enable or disable the auxiliary preview image function in another manner, for example, by using a voice command, using an air gesture, pressing a physical key or a combination of physical keys.

After the photographing interface that can simultaneously display the primary preview image in the first viewfinder frame and the auxiliary preview image in the second viewfinder frame is described, the following describes in detail, with reference to an exemplary scenario, a process in which the user performs framing composition on the primary preview image in the first viewfinder frame by using the auxiliary preview image in the second viewfinder frame, and tracks and photographs a moving photographed subject.

It may be understood that, in both a photographing scenario and a video recording scenario, the user may use the auxiliary preview image in the second viewfinder frame to perform shooting. The photographing scenario is used as an example herein for description.

Scenario 1: Photograph a static scene and use the auxiliary preview image to perform framing composition.

Figure 5:
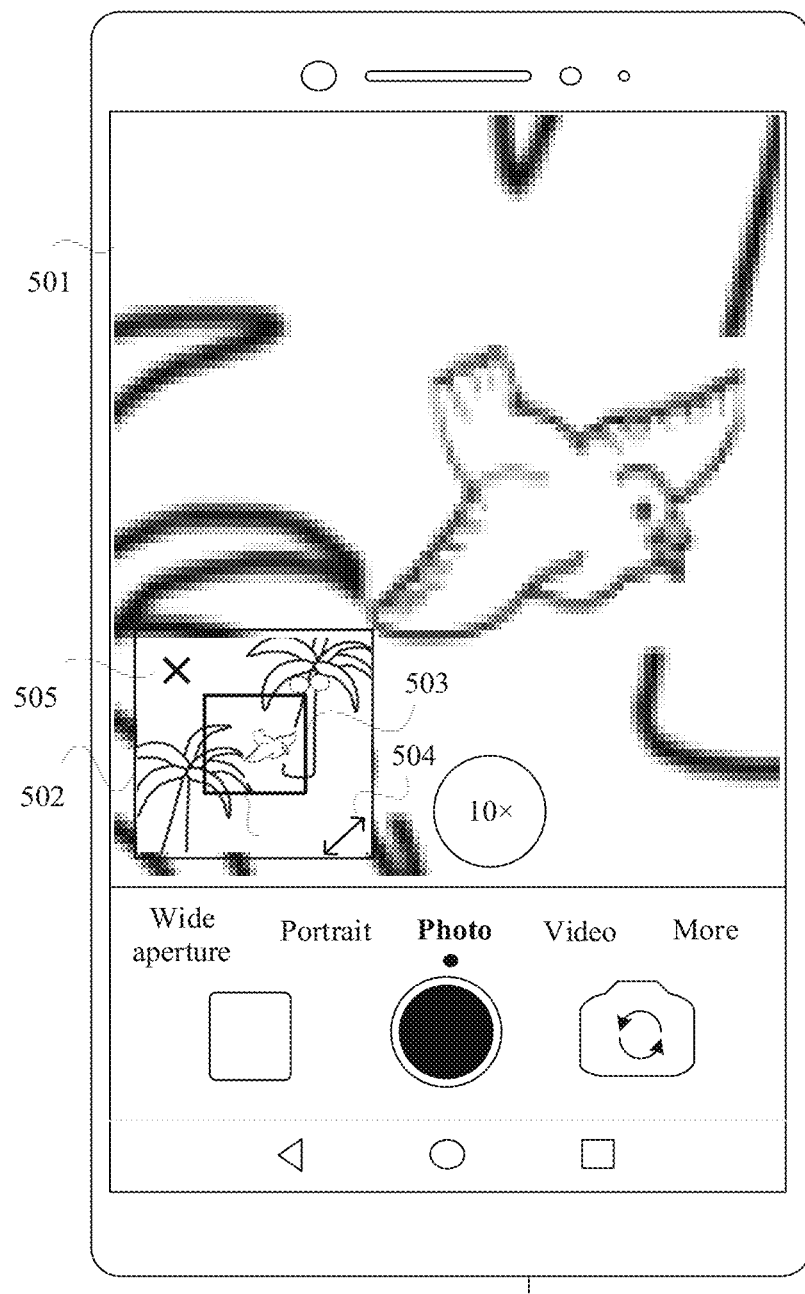
FIG. 5(1) to FIG. 5(4) are a schematic diagram of still some user interfaces of an electronic device according to an embodiment of this application.
Figure 5:
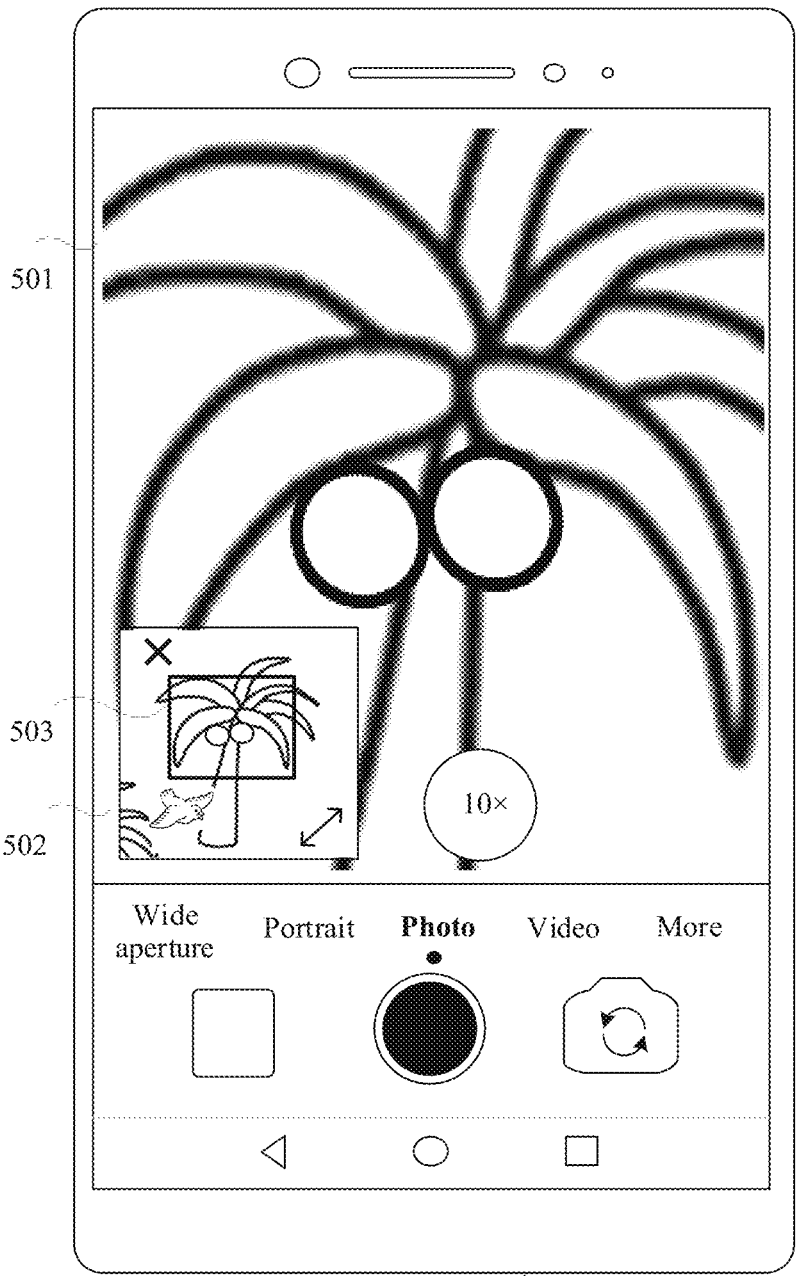
Figure 5:
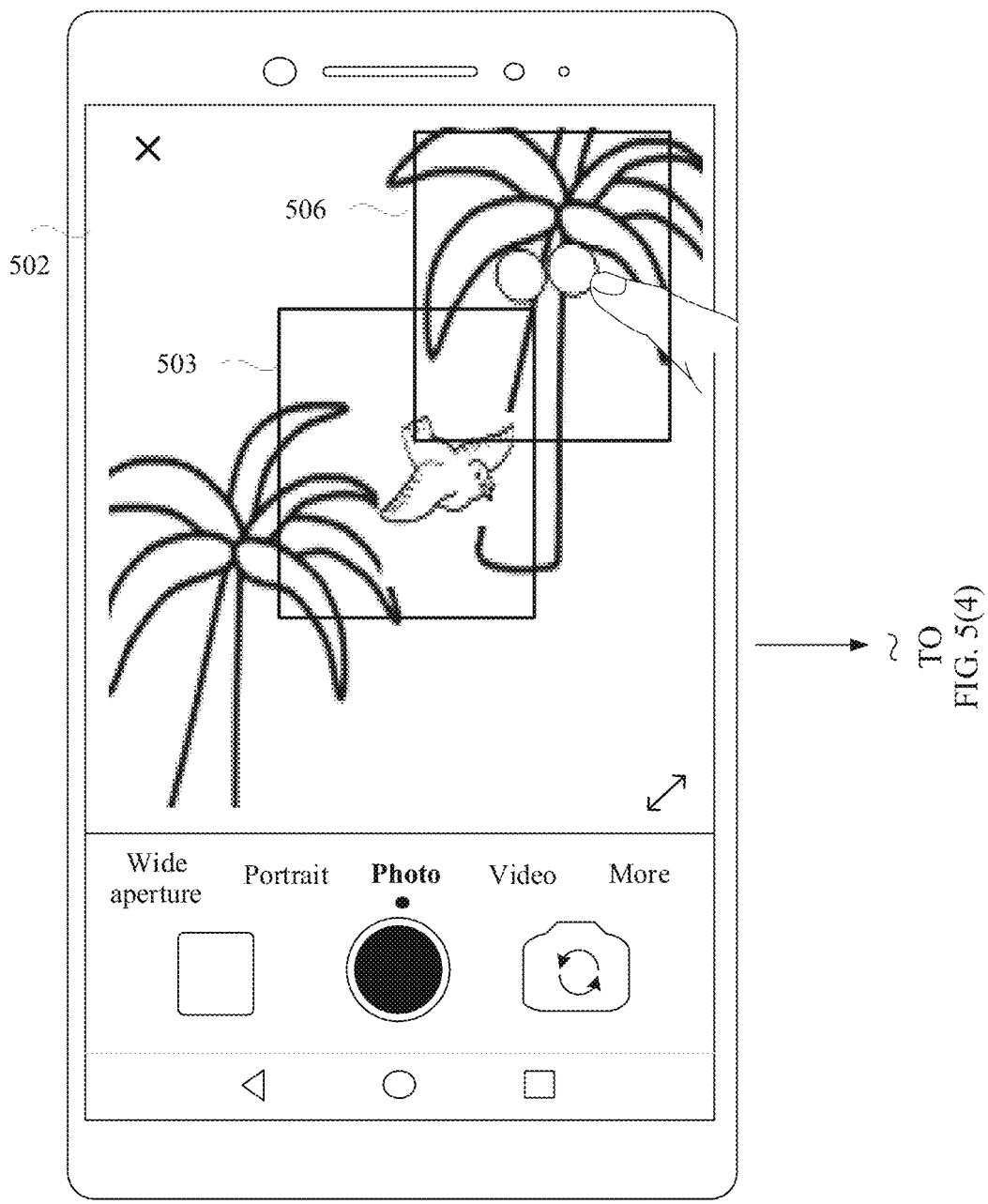
Figure 5:
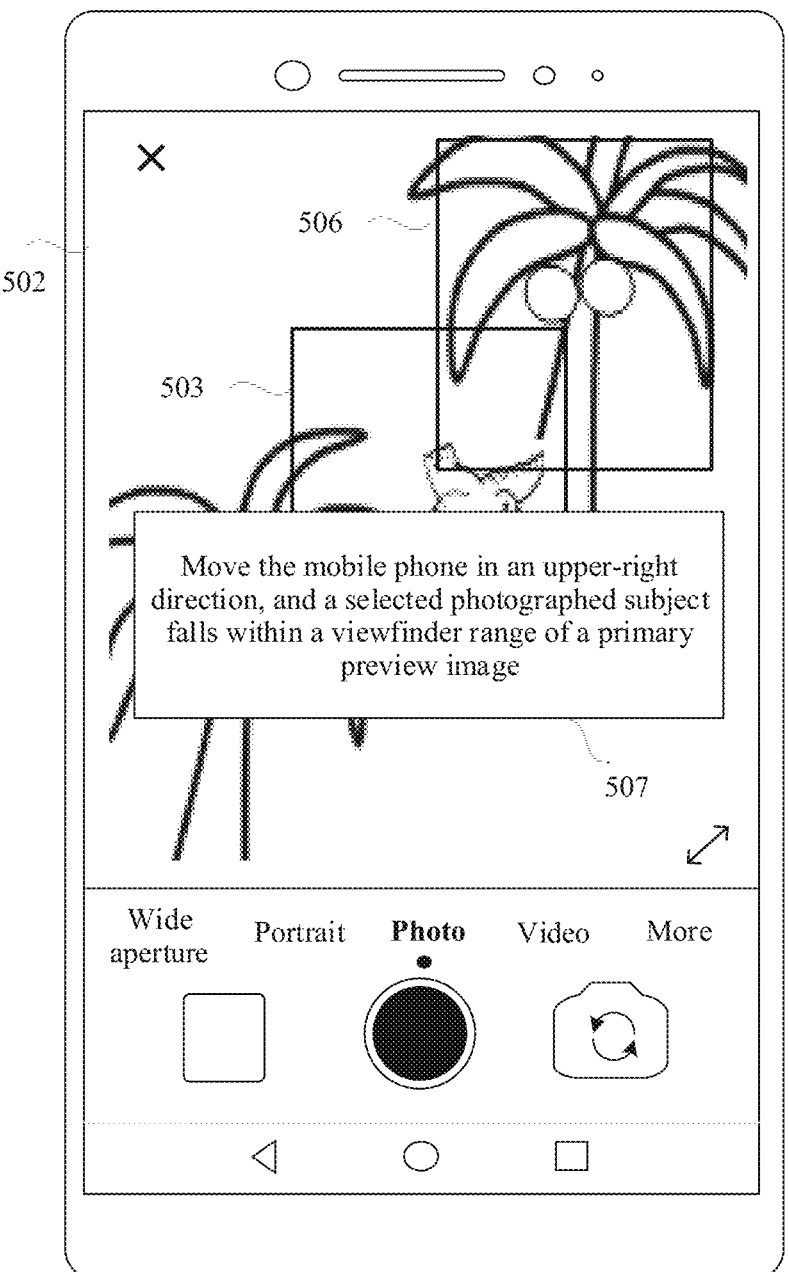

For example, as shown in FIG. 5(1), a mobile phone displays a photographing interface. The photographing interface includes a primary preview image in a first viewfinder frame 501 and an auxiliary preview image in a second viewfinder frame 502. In this case, a zoom magnification of the mobile phone is "10×", and only one bird can be clearly and fully seen in the primary preview image in the first viewfinder frame 501. If a user wants to photograph another object, the user may search for a new photographed object from a larger viewfinder range in the second viewfinder frame 502. For example, the user may select, from the auxiliary preview image in the second viewfinder frame 502, a coconut of a distant coconut tree for photographing.

In an example, because a first marker frame 503 in the second viewfinder frame 502 clearly identifies a viewfinder range of the first viewfinder frame, the user may move the mobile phone or flip the mobile phone based on a relative position relationship between the new photographed object and the first marker frame 503. For example, if the new photographed object coconut is located on the upper right of the first marker frame, the user moves the mobile phone in an upper-right direction or flips the mobile phone in an upper-right direction. It should be noted that, in a process of moving the mobile phone, the mobile phone also refreshes, in real time, the auxiliary preview image in the second viewfinder frame 502. Therefore, the user may determine whether the new photographed object has moved into the first marker frame 503 in the auxiliary preview image, so as to determine that the new photographed object has moved into the viewfinder range of the first viewfinder frame. Further, because a viewfinder range of an image in the first marker frame 503 is the same as that of the image in the first viewfinder frame 501, the user may perform framing composition on the first marker frame 503 in the auxiliary preview image, to implement framing composition on the first viewfinder frame 501. For example, FIG. 5(2) shows a photographing interface of the new photographed object determined by the user.

Optionally, the user may also operate a scale control 504 to scale up the auxiliary preview image in the second viewfinder frame 502, to more clearly view details in the auxiliary preview image, and perform framing composition on the primary preview image.

Optionally, after completing framing composition of the primary preview image, the user may close the second viewfinder frame 502 by operating a close control 505 in the second viewfinder frame 502. In this way, it is convenient for the user to view a full primary preview image, to avoid that the auxiliary preview image blocks sight of the user in a photographing process.

In another example, the user may alternatively select a to-be-photographed object in the auxiliary preview image. The mobile phone may automatically calculate a relative direction and a distance between the to-be-photographed object and the current first marker frame, and prompt the user to move or flip the mobile phone, so that the to-be-photographed object moves into the first marker frame, and framing composition of the to-be-photographed object is completed.

For example, on the photographing interface shown in FIG. 5(1), the user may operate the scale control 504 to scale up the auxiliary preview image in the second viewfinder frame 502, for example, display a photographing interface shown in FIG. 5(3). Optionally, on the photographing interface shown in FIG. 5(3), prompt information may also be displayed, to prompt the user that a current preview image is the auxiliary preview image. Alternatively, on the photographing interface shown in FIG. 5(3), a control for restoring the primary preview image in the first viewfinder frame may be displayed, to prompt the user that the current preview image is the auxiliary preview image, and to quickly restore the primary preview image in the first viewfinder frame by using the control. Optionally, on the photographing interface, an indication of a zoom magnification currently used by the mobile phone may also be hidden, to prevent the user from confusing a zoom magnification corresponding to the auxiliary preview image with the zoom magnification currently used by the mobile phone. In an example, when the mobile phone displays the primary preview image again, the indication of the zoom magnification currently used by the mobile phone may also be automatically restored.

The user may select the to-be-photographed object in the auxiliary preview image in the second viewfinder frame 502. In an example, the user may tap a coconut in the auxiliary preview image, and the mobile phone may automatically select, by using a location at which the user taps as a center, a second marker frame 506 whose area is the same as the first marker frame 503. The second marker frame 506 may be considered as the to-be-photographed object selected by the user. The mobile phone may calculate a relative direction and a distance between a central position of the first marker frame 503 and the central position of the second marker frame 506. Then, based on the calculated relative direction and distance, a direction and a distance that the mobile phone should move, or an angle at which the mobile phone should flip, are calculated, and the user is prompted with prompt information 507 shown in FIG. 5(4). Certainly, the mobile phone may also indicate the user to move or flip the mobile phone in another manner, for example, by voice, pattern (arrow), animation, or the like. In another example, the mobile phone may alternatively recognize a scene in the auxiliary preview image in the second viewfinder frame 502 by using an image recognition technology. After the user selects the to-be-photographed object, the user uses the recognized object as a unit, and determines the recognized object as the to-be-photographed object. That is, the area of the second marker frame 506 may be different from the area of the first marker frame 503.

In addition, in this example, the photographing interface may further display other content, for example, display information that prompts the user to select the to-be-photographed object or play a voice. For another example, in a process in which the user moves the mobile phone, the mobile phone may also calculate, in real time, a to-be-moved direction, a distance, and the like, and update guidance information in real time.

After determining to move the to-be-photographed object into the first marker frame 503, the user may close the second viewfinder frame 502 by tapping the close control

505. In this case, the mobile phone displays the primary preview image in the first viewfinder frame 501. Optionally, the user may also tap the scale control 504 to scale down the auxiliary preview image in the second viewfinder frame 502. In this case, the mobile phone displays the primary preview image in the first viewfinder frame 501 and the auxiliary preview image in the second viewfinder frame 502. The user determines, based on the primary preview image and the auxiliary preview image, an occasion for indicating the mobile phone to perform a photographing operation.

After the mobile phone performs the photographing operation, a field of view of an image finally generated by the mobile phone is the same as that of the image in the second viewfinder frame.

It should be noted that, in the foregoing first technical solution, to be specific, in a solution in which original images captured by a same camera (for example, a long-focus camera) are separately processed to obtain the primary preview image in the first viewfinder frame and the auxiliary preview image in the second viewfinder frame, an image (that is, the primary preview image in the first viewfinder frame) finally photographed by the mobile phone is an image obtained by cropping a central area of the original image (or the auxiliary preview image in the second viewfinder frame) captured by the camera, and performing digital zoom. The cropped image corresponds to a zoom magnification K1 currently used by the mobile phone, a zoom magnification corresponding to an original image captured by a current camera is K3, and an area of the cropped image/an area of the original image=$(K1/K3)^2$. Alternatively, a zoom magnification corresponding to the auxiliary preview image in the second viewfinder frame is K2, and an area of the cropped image/an area of the auxiliary preview image in the second viewfinder frame=$(K1/K2)^2$. For example, if the zoom magnification currently used by the mobile phone is "10×", and a zoom magnification corresponding to the long-focus camera is "5×", the area of the cropped image is one quarter of the area of the original image.

Based on the inventive concept of this application, it may be considered that the user selects the to-be-photographed object in the auxiliary preview image, and the mobile phone may also use a photographed object selected by the user as a center to perform cropping, to obtain a final photographed image. That is, after the user selects the new photographed object in the auxiliary preview image, the user may alternatively not move the mobile phone. For example, the user may tap the coconut in the auxiliary preview image, and the mobile phone may automatically select, by using a location at which the user taps as a center, an image in a field of view range corresponding to the zoom magnification currently used by the mobile phone. After the user indicates the mobile phone to perform the photographing operation, the mobile phone crops an image in the range from the original image (or the preview image in the second viewfinder frame) photographed by the camera, and performs digital zoom to obtain the final photographed image.

Scenario 2: Track and photograph a moving object.

In a case, when a user uses a mobile phone to point at a to-be-photographed object, the to-be-photographed object is first located in a first viewfinder frame. When the to-be-photographed object is displaced (a displacement speed is relatively slow, and a displacement distance is relatively short), and moves outside the first viewfinder frame, if the to-be-photographed object is still in a second viewfinder frame, according to the method in scenario 1, the user may manually adjust a position of the mobile phone based on an auxiliary preview image in the second viewfinder frame, so that the to-be-photographed object moves into a first marker frame of the auxiliary preview image.

In another case, when the to-be-photographed object is in a moving state (in case of continuous displacement or rapid displacement), the mobile phone may mark the to-be-photographed object in the auxiliary preview image in the second viewfinder frame, so that the user can conveniently notice a movement track of the to-be-photographed object in the auxiliary preview image.

Figure 6:
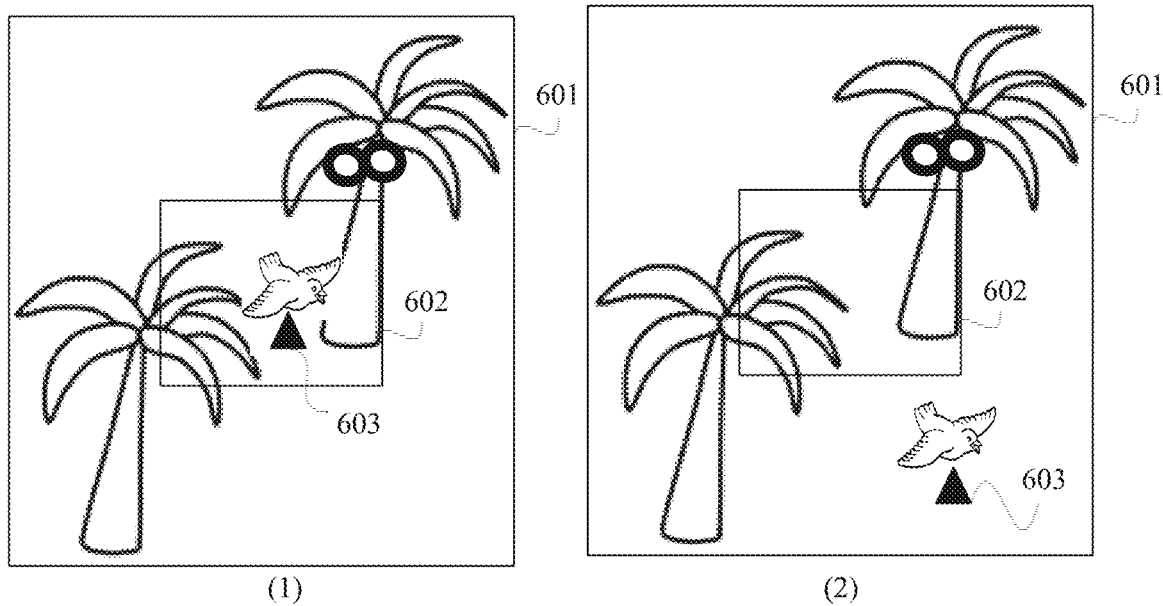
FIG. 6 is a schematic diagram of still some user interfaces of an electronic device according to an embodiment of this application.

For example, FIG. 6(1) shows a schematic diagram of auxiliary preview of a second viewfinder frame 601. In this case, it may be seen that the to-be-photographed object is first located in a first marker frame 602, that is, within a viewfinder range of the first viewfinder frame (not shown herein). The auxiliary preview image may include a marker 603, and the marker 603 is used to mark the to-be-photographed object. For example, a striking triangular marker is used to mark under the to-be-photographed object, or a rectangular frame is used to circle the to-be-photographed object. A marking manner is not limited in this application.

In some examples, as shown in FIG. 6(2), when the to-be-photographed object moves outside the first marker frame, the user may quickly locate a position of the to-be-photographed object based on the marker 603, and adjust a moving direction or a moving distance of the mobile phone. Alternatively, after detecting that the marker 603 moves out of the first marker frame, the mobile phone may automatically perform calculation based on a position of the marker 603 and a position of the first marker frame, to calculate a direction or position in which the mobile phone should move, or an angle at which the mobile phone should be rotated. The mobile phone displays a prompt message or a prompt identifier, or plays a voice to indicate the user to move the mobile phone or rotate the mobile phone.

A method for determining the to-be-photographed object by the mobile phone may be that the user specifies the to-be-photographed object, or the mobile phone automatically determines, based on the fact that an object (for example, a bird) is identified in M (M is an integer greater than 2) consecutive pictures in the first viewfinder frame, the object as the to-be-photographed object.

Optionally, after determining the to-be-photographed object, the mobile phone may perform auto-focusing on the to-be-photographed object in the first viewfinder frame, to photograph a clearer to-be-photographed object.

In still another case, when the to-be-photographed object moves at a relatively fast speed, moves out of the first marker frame, and moves out of the second viewfinder frame, the user may increase a zoom magnification of the second viewfinder frame to enlarge a viewfinder range of the second viewfinder frame, so that the to-be-photographed object can be found in a larger viewfinder range.

Figure 7:
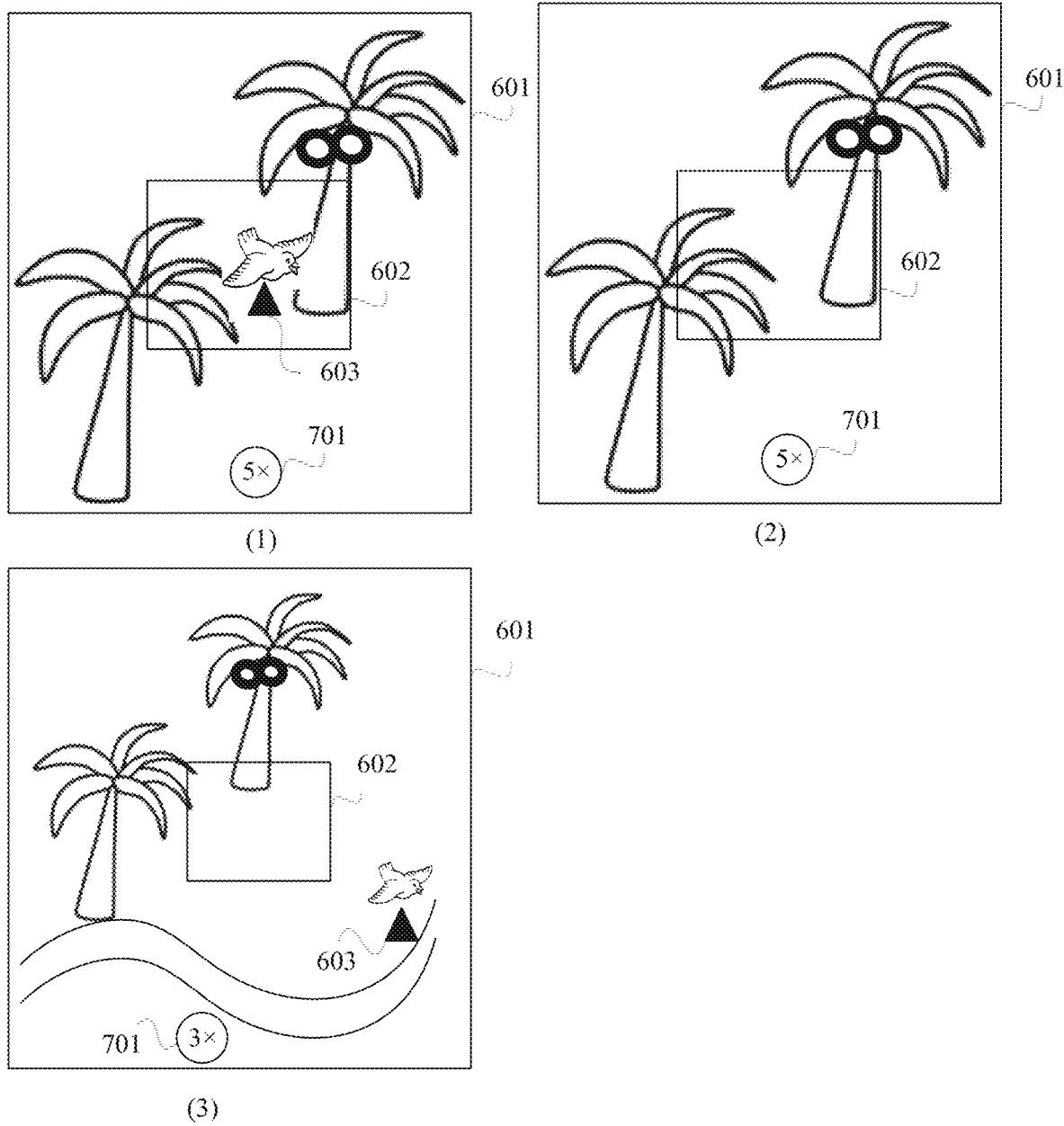
FIG. 7 is a schematic diagram of still some user interfaces of an electronic device according to an embodiment of this application.

For example, FIG. 7(1) shows a schematic diagram of auxiliary preview of the second viewfinder frame 601. In this case, it may be seen that the to-be-photographed object is first located in the first marker frame 602, that is, within the viewfinder range of the first viewfinder frame (not shown herein). The second viewfinder frame 601 may further include a zoom magnification indicator 701, used to indicate a zoom magnification of an auxiliary preview image in the second viewfinder frame 601. In this case, the zoom magnification of the auxiliary preview image is "5×".

As shown in FIG. 7(2), when the to-be-photographed object moves at a relatively fast speed or hands of the user shake, and the to-be-photographed object is not in the auxiliary preview image in the second viewfinder frame, because the to-be-photographed object should be near the photographing position, the to-be-photographed object may be found by changing the zoom magnification of the auxiliary preview image. For example, the mobile phone may be indicated to reduce the zoom magnification of the auxiliary preview image, to increase a viewfinder range of the auxiliary preview image. As shown in FIG. 7(3), when the zoom magnification of the auxiliary preview image is a relatively small value (for example, "3×"), the to-be-photographed object appears in the auxiliary preview image. The user may further move or flip the mobile phone based on the auxiliary preview image.

It should be noted that the zoom magnification indication 701 in the second viewfinder frame 601 herein is irrelevant to the zoom magnification currently used by the mobile phone. The zoom magnification currently used by the mobile phone is a zoom magnification of a primary preview image in the first viewfinder frame.

For another example, when the mobile phone detects that the to-be-photographed object moves out of the first marker frame 602, the mobile phone may also automatically decrease the zoom magnification of the auxiliary preview image until the to-be-photographed object appears in the auxiliary preview image.

Optionally, when the user moves or flips the mobile phone to enable the to-be-photographed object to reappear in the first marker frame 602, the mobile phone may also automatically adjust the zoom magnification of the auxiliary preview image back to a default value (for example, "10×").

It can be learned that the mobile phone may use the second viewfinder frame 601 to track and photograph the to-be-photographed object.

In still another case, the user may indicate to increase the zoom magnification of the auxiliary preview image in the second viewfinder frame or the mobile phone may automatically increase the zoom magnification of the auxiliary preview image in the second viewfinder frame, to view a clearer scene near the first marker frame, so as to facilitate framing composition on an image in the first marker frame. Related operations are similar and are not described herein again.

The foregoing embodiment is described by using photographing in the camera application as an example. The auxiliary preview function in this application may also be used for video recording in the camera application. A method is similar, and is briefly described herein.

When the mobile phone enables a video recording function and does not start recording, the method provided in this application may be used to display the primary preview image and the auxiliary preview image in a case of a high zoom magnification (the zoom magnification is greater than the first preset magnification). This helps the user perform composition design on the primary preview image based on the auxiliary preview image with a larger viewfinder range.

In a video recording process of the mobile phone, in a high zoom magnification scenario, the primary preview image and the auxiliary preview image are displayed, so that the user can perform framing based on the auxiliary preview image and track and photograph a moving object in the video recording process.

For example, in the video recording process, if an object that the user wants to photograph changes, the user may determine a new photographed object by using the auxiliary preview image with a larger viewfinder range in the second viewfinder frame, and move the mobile phone to continue recording. Alternatively, the new photographed object is selected in the second viewfinder frame, and the mobile phone may display or play a prompt to indicate the user to move the mobile phone, so that the new photographed object appears in the first viewfinder frame (that is, a recorded range).

For another example, in the video recording process, if the object photographed by the user is in a moving state, the mobile phone may mark the photographed object in the auxiliary preview image in the second viewfinder frame, so that the user can conveniently notice a movement track of the photographed object in the auxiliary preview image. When the photographed object moves out of the primary preview image, the user can quickly find the photographed object by using the auxiliary preview image, and move the mobile phone to quickly retrieve the photographed object. Alternatively, the mobile phone may indicate the user to move the mobile phone based on a marker. For other content, refer to descriptions of the foregoing related content. Details are not described herein again.

Figure 8:
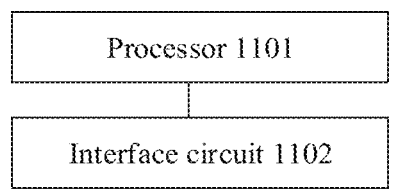
FIG. 8 is a schematic diagram of still some user interfaces of an electronic device according to an embodiment of this application.

An embodiment of this application further provides a chip system. As shown in FIG. 8, the chip system includes at least one processor 1101 and at least one interface circuit 1102. The processor 1101 and the interface circuit 1102 may be interconnected through a line. For example, the interface circuit 1102 may be configured to receive a signal from another apparatus (for example, a memory of the electronic device 100). For another example, the interface circuit 1102 may be configured to send a signal to another apparatus (for example, the processor 1101). For example, the interface circuit 1102 may read instructions stored in the memory, and send the instructions to the processor 1101. When the instructions are executed by the processor 1101, the electronic device is enabled to perform steps performed by the electronic device 100 (for example, the mobile phone) in the foregoing embodiments. Certainly, the chip system may further include another discrete device. This is not specifically limited in this embodiment of this application.

An embodiment of this application further provides an apparatus. The apparatus is included in an electronic device, and the apparatus has a function of implementing behavior of the electronic device in any method in the foregoing embodiments. The function may be implemented by hardware, or may be implemented by hardware executing corresponding software. The hardware or the software includes at least one module or unit corresponding to the function, for example, a detection module or unit, a display module or unit, a determining module or unit, and a calculation module or unit.

An embodiment of this application further provides a computer storage medium, including computer instructions. When the computer instructions are run on an electronic device, the electronic device is enabled to perform any method in the foregoing embodiments.

An embodiment of this application further provides a computer program product. When the computer program product is run on a computer, the computer is enabled to perform any method in the foregoing embodiments.

An embodiment of this application further provides a graphical user interface on an electronic device. The electronic device includes a display, a camera, a memory, and one or more processors. The one or more processors are configured to execute one or more computer programs stored in the memory; and the graphical user interface includes a graphical user interface displayed when the electronic device performs any method in the foregoing embodiments.

It may be understood that to implement the foregoing functions, the terminal or the like includes corresponding hardware structures and/or software modules for performing the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present disclosure.

In the embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of the present disclosure, module division is an example, and is merely a logical function division. In actual implementation, another division manner may be used.

The foregoing descriptions about implementations allow the person skilled in the art to understand that, for the purpose of convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely exemplary implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A photographing preview method, wherein the method is applied to an electronic device comprising a camera, and the method comprises:

capturing, by the electronic device, a picture by using the camera;

performing, by the electronic device, a first zoom processing on the picture to obtain a first preview picture;

displaying, by the electronic device, a first viewfinder frame, wherein the first viewfinder frame is configured to display the first preview picture, and a zoom magnification of the camera corresponding to the first preview picture is a first zoom magnification;

in response to receiving a first operation input from a user that instructs to increase the zoom magnification of the camera, displaying, by the electronic device, a second preview picture in the first viewfinder frame, wherein a zoom magnification of the camera corresponding to the second preview picture is a second zoom magnification, and the second zoom magnification is greater than the first zoom magnification;

in response to the second zoom magnification being greater than or equal to a preset zoom magnification, performing, by the electronic device, a second zoom processing on the picture to obtain a third preview picture, wherein a zoom magnification of the camera corresponding to the third preview picture is a third zoom magnification, and the third zoom magnification is less than or equal to the first zoom magnification, and wherein the first zoom processing and the second zoom processing are performed on the same picture captured by the same camera; and displaying, by the electronic device, a second viewfinder frame, wherein the second viewfinder frame is configured to display the third preview picture, and a viewfinder range of the camera corresponding to the third preview picture is greater than a viewfinder range of the camera corresponding to the second preview picture, and wherein the second viewfinder frame further comprises a marker frame, and the marker frame identifies an area in the third preview picture whose viewfinder range is the same as that of in the second preview picture.

2. The method according to claim 1, wherein displaying, by the electronic device, the first viewfinder frame comprises:

displaying, by the electronic device, the first viewfinder frame on a photographing preview interface; or displaying, by the electronic device, the first viewfinder frame on a video recording interface.

3. The method according to claim 1, wherein the method further comprises:

in response to receiving a second operation input from the user that instructs to increase the zoom magnification of the camera, displaying, by the electronic device, a fourth preview picture in the first viewfinder frame, wherein a zoom magnification of the camera corresponding to the fourth preview picture is a fourth zoom magnification, and the fourth zoom magnification is greater than the second zoom magnification;

in response to the second zoom magnification being greater than or equal to the preset zoom magnification, performing, by the electronic device, a third zoom processing on the picture to obtain a fifth preview picture, wherein a zoom magnification of the camera corresponding to the fifth preview picture is a fifth zoom magnification, and the fifth zoom magnification is less than or equal to the first zoom magnification; and displaying, by the electronic device, the fifth preview picture in the second viewfinder frame, wherein a viewfinder range of the camera corresponding to the fifth preview picture is the same as the viewfinder range of the camera corresponding to the third preview picture, and a size of the marker frame in the second viewfinder frame becomes smaller.

4. The method according to claim 1, wherein the method further comprises:

in response to receiving a third operation input from the user that instructs to decrease the zoom magnification of the camera, displaying, by the electronic device, a sixth preview picture in the first viewfinder frame, wherein a zoom magnification of the camera corresponding to the sixth preview picture is a sixth zoom magnification, and the sixth zoom magnification is less than the second zoom magnification;

in response to the sixth zoom magnification being greater than or equal to the preset zoom magnification, performing, by the electronic device, a fourth zoom processing on the picture to obtain a seventh preview picture, wherein a zoom magnification of the camera corresponding to the seventh preview picture is a seventh zoom magnification, and the seventh zoom magnification is less than or equal to the first zoom magnification; and displaying, by the electronic device, the seventh preview picture in the second viewfinder frame, wherein a viewfinder range of the camera corresponding to the seventh preview picture is the same as the viewfinder range of the camera corresponding to the third preview picture; and a size of the marker frame in the second viewfinder frame becomes larger; or in response to the sixth zoom magnification being less than the preset zoom magnification, skipping displaying, by the electronic device, the second viewfinder frame.

5. The method according to claim 1, wherein the method further comprises:

in response to receiving a fourth operation input from the user that instructs to increase the zoom magnification of the camera, displaying, by the electronic device, an eighth preview picture in the first viewfinder frame, wherein a zoom magnification of the camera corresponding to the eighth preview picture is an eighth zoom magnification, and the eighth zoom magnification is greater than the second zoom magnification;

in response to the second zoom magnification being greater than or equal to the preset zoom magnification, performing, by the electronic device, a fifth zoom processing on the picture to obtain a ninth preview picture, wherein a zoom magnification of the camera corresponding to the ninth preview picture is a ninth zoom magnification, and the ninth zoom magnification is less than or equal to the first zoom magnification; and displaying, by the electronic device, the ninth preview picture in the second viewfinder frame, wherein a viewfinder range of the camera corresponding to the ninth preview picture is greater than a viewfinder range of the camera corresponding to the eighth preview picture, and is smaller than the viewfinder range of the camera corresponding to the third preview picture.

6. The method according to claim 1, wherein the method further comprises:

in response to receiving a fifth operation input from the user that instructs to decrease the zoom magnification of the camera, displaying, by the electronic device, a tenth preview picture in the first viewfinder frame, wherein a zoom magnification of the camera corresponding to the tenth preview picture is a tenth zoom magnification, and the tenth zoom magnification is less than the second zoom magnification;

in response to the tenth zoom magnification being greater than or equal to the preset zoom magnification, performing, by the electronic device, a sixth zoom processing on the picture to obtain an eleventh preview picture, wherein a zoom magnification of the camera corresponding to the eleventh preview picture is an eleventh zoom magnification, and the eleventh zoom magnification is less than or equal to the first zoom magnification; and displaying, by the electronic device, the eleventh preview picture in the second viewfinder frame, wherein a viewfinder range of the camera corresponding to the eleventh preview picture is greater than a viewfinder range of the camera corresponding to the tenth preview picture, and is greater than the viewfinder range of the camera corresponding to the third preview picture; or in response to the tenth zoom magnification being less than the preset zoom magnification, skipping displaying, by the electronic device, the second viewfinder frame.

7. The method according to claim 1, wherein the camera is a long-focus camera.

8. The method according to claim 1, wherein in response to a zoom magnification corresponding to a preview picture displayed in the second viewfinder frame being K1, and a zoom magnification corresponding to a preview picture displayed in the first viewfinder frame being K2, a value of an area of the preview picture in the second viewfinder frame identified by the marker frame/an area of the preview picture displayed in the second viewfinder frame is $(K1/K2)^2$.

9. The method according to claim 1, wherein while displaying the second viewfinder frame, the electronic device further displays a close control corresponding to the second viewfinder frame, and the method further comprises:

in response to an operation performed by the user on the close control corresponding to the second viewfinder frame, closing, by the electronic device, the second viewfinder frame.

10. The method according to claim 9, wherein the method further comprises:

in response to the electronic device closing the second viewfinder frame, displaying, by the electronic device, a restoration control corresponding to the second viewfinder frame.

11. The method according to claim 1, wherein the method further comprises:

marking, by the electronic device, a target photographed object in a preview picture displayed in the second viewfinder frame.

12. The method according to claim 1, wherein displaying, by the electronic device, the second preview picture in the first viewfinder frame comprises:

performing, by the electronic device, an electronic image stabilization (EIS) on the second preview picture.

13. The method according to claim 12, wherein performing, by the electronic device, the EIS on the second preview picture comprises:

adjusting, by the electronic device, one or more deviations of the second preview picture caused by one or more shakes of the electronic device.

14. The method according to claim 13, wherein the method further comprises:
determining, by the electronic device, the marker frame for the second viewfinder frame by compensating the one or more deviations of the second preview picture.

15. An electronic device, comprising a processor, a non-transitory memory, and a touchscreen, wherein the non-transitory memory and the touchscreen are coupled to the processor, the non-transitory memory has a computer program code stored thereon, the computer program code comprises computer-executable instructions which, when executed by the processor, cause the electronic device to perform a photographing preview method, comprising:
capturing a picture by using a camera of the electronic device;
performing a first zoom processing on the picture to obtain a first preview picture;
displaying a first viewfinder frame, wherein the first viewfinder frame is configured to display the first preview picture, and a zoom magnification of the camera corresponding to the first preview picture is a first zoom magnification;
in response to receiving a first operation input from a user that instructs to increase the zoom magnification of the camera, displaying a second preview picture in the first viewfinder frame, wherein a zoom magnification of the camera corresponding to the second preview picture is a second zoom magnification, and the second zoom magnification is greater than the first zoom magnification;
in response to the second zoom magnification being greater than or equal to a preset zoom magnification, performing a second zoom processing on the picture to obtain a third preview picture, wherein a zoom magnification of the camera corresponding to the third preview picture is a third zoom magnification, and the third zoom magnification is less than or equal to the first zoom magnification, and wherein the first zoom processing and the second zoom processing are performed on the same picture captured by the same camera; and
displaying a second viewfinder frame, wherein the second viewfinder frame is configured to display the third preview picture, and a viewfinder range of the camera corresponding to the third preview picture is greater than a viewfinder range of the camera corresponding to the second preview picture, and
wherein the second viewfinder frame further comprises a marker frame, and the marker frame identifies an area in the third preview picture whose viewfinder range is the same as that of in the second preview picture.

16. The electronic device according to claim 15, wherein the method further comprises:
in response to receiving a second operation input from the user that instructs to increase the zoom magnification of the camera, displaying a fourth preview picture in the first viewfinder frame, wherein a zoom magnification of the camera corresponding to the fourth preview picture is a fourth zoom magnification, and the fourth zoom magnification is greater than the second zoom magnification;
in response to the second zoom magnification being greater than or equal to the preset zoom magnification, performing a third zoom processing on the picture to obtain a fifth preview picture, wherein a zoom magnification of the camera corresponding to the fifth preview picture is a fifth zoom magnification, and the fifth zoom magnification is less than or equal to the first zoom magnification; and
displaying the fifth preview picture in the second viewfinder frame, wherein a viewfinder range of the camera corresponding to the fifth preview picture is the same as the viewfinder range of the camera corresponding to the third preview picture, and a size of the marker frame in the second viewfinder frame becomes smaller.

17. The electronic device according to claim 15, wherein the method further comprises:
in response to receiving a third operation input from the user that instructs to decrease the zoom magnification of the camera, displaying a sixth preview picture in the first viewfinder frame, wherein a zoom magnification of the camera corresponding to the sixth preview picture is a sixth zoom magnification, and the sixth zoom magnification is less than the second zoom magnification;
in response to the sixth zoom magnification being greater than or equal to the preset zoom magnification, performing a fourth zoom processing on the picture to obtain a seventh preview picture, wherein a zoom magnification of the camera corresponding to the seventh preview picture is a seventh zoom magnification, and the seventh zoom magnification is less than or equal to the first zoom magnification; and
displaying the seventh preview picture in the second viewfinder frame, wherein a viewfinder range of the camera corresponding to the seventh preview picture is the same as the viewfinder range of the camera corresponding to the third preview picture; and a size of the marker frame in the second viewfinder frame becomes larger; or
in response to the sixth zoom magnification being less than the preset zoom magnification, skipping displaying the second viewfinder frame.

18. The electronic device according to claim 15, wherein the method further comprises:
in response to receiving a fourth operation input from the user that instructs to increase the zoom magnification of the camera, displaying an eighth preview picture in the first viewfinder frame, wherein a zoom magnification of the camera corresponding to the eighth preview picture is an eighth zoom magnification, and the eighth zoom magnification is greater than the second zoom magnification;
in response to the second zoom magnification being greater than or equal to the preset zoom magnification, performing a fifth zoom processing on the picture to obtain a ninth preview picture, wherein a zoom magnification of the camera corresponding to the ninth preview picture is a ninth zoom magnification, and the ninth zoom magnification is less than or equal to the first zoom magnification; and
displaying the ninth preview picture in the second viewfinder frame, wherein a viewfinder range of the camera corresponding to the ninth preview picture is greater than a viewfinder range of the camera corresponding to the eighth preview picture, and is smaller than the viewfinder range of the camera corresponding to the third preview picture.

19. The electronic device according to claim 15, wherein the method further comprises:

in response to receiving a fifth operation input from the user that instructs to decrease the zoom magnification of the camera, displaying a tenth preview picture in the first viewfinder frame, wherein a zoom magnification of the camera corresponding to the tenth preview picture is a tenth zoom magnification, and the tenth zoom magnification is less than the second zoom magnification;

in response to the tenth zoom magnification being greater than or equal to the preset zoom magnification, performing a sixth zoom processing on the picture to obtain an eleventh preview picture, wherein a zoom magnification of the camera corresponding to the eleventh preview picture is an eleventh zoom magnification, and the eleventh zoom magnification is less than or equal to the first zoom magnification; and displaying the eleventh preview picture in the second viewfinder frame, wherein a viewfinder range of the camera corresponding to the eleventh preview picture is greater than a viewfinder range of the camera corresponding to the tenth preview picture, and is greater than the viewfinder range of the camera corresponding to the third preview picture; or in response to the tenth zoom magnification being less than the preset zoom magnification, skipping displaying the second viewfinder frame.

20. A computer-readable storage medium having computer-executable instructions stored thereon which, wherein when executed by a processor of an electronic device, cause the electronic device to perform a photographing preview method, comprising:

capturing a picture by using a camera of the electronic device;

performing a first zoom processing on the picture to obtain a first preview picture;

displaying a first viewfinder frame, wherein the first viewfinder frame is configured to display the first preview picture, and a zoom magnification of the camera corresponding to the first preview picture is a first zoom magnification;

in response to receiving a first operation input from a user that instructs to increase the zoom magnification of the camera, displaying a second preview picture in the first viewfinder frame, wherein a zoom magnification of the camera corresponding to the second preview picture is a second zoom magnification, and the second zoom magnification is greater than the first zoom magnification;

in response to the second zoom magnification being greater than or equal to a preset zoom magnification, performing a second zoom processing on the picture to obtain a third preview picture, wherein a zoom magnification of the camera corresponding to the third preview picture is a third zoom magnification, and the third zoom magnification is less than or equal to the first zoom magnification, and wherein the first zoom processing and the second zoom processing are performed on the same picture captured by the same camera; and displaying a second viewfinder frame, wherein the second viewfinder frame is configured to display the third preview picture, and a viewfinder range of the camera corresponding to the third preview picture is greater than a viewfinder range of the camera corresponding to the second preview picture, and wherein the second viewfinder frame further comprises a marker frame, and the marker frame identifies an area in the third preview picture whose viewfinder range is the same as that of in the second preview picture.

* * * * *